United States Patent
Wu et al.

(10) Patent No.: US 10,845,007 B2
(45) Date of Patent: Nov. 24, 2020

(54) IN-PIPE LEAK DETECTION SYSTEMS, DEVICES, AND METHODS

(71) Applicants: Massachusetts Institute of Technology, Cambridge, MA (US); King Fahd University of Petroleum and Minerals, Dhahran (SA)

(72) Inventors: You Wu, Changzhou (CN); Kamal Youcef-Toumi, Cambridge, MA (US); Kristina S. Kim, Federal Way, WA (US); Michael Finn Henry, Lincoln, MA (US); Rached Ben Mansour, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/341,139

(22) PCT Filed: Oct. 17, 2017

(86) PCT No.: PCT/US2017/056890
§ 371 (c)(1),
(2) Date: Apr. 11, 2019

(87) PCT Pub. No.: WO2018/075458
PCT Pub. Date: Apr. 26, 2018

(65) Prior Publication Data
US 2019/0368664 A1    Dec. 5, 2019

Related U.S. Application Data

(60) Provisional application No. 62/409,033, filed on Oct. 17, 2016.

(51) Int. Cl.
*F17D 5/06* (2006.01)
*G01M 3/08* (2006.01)
(Continued)

(52) U.S. Cl.
CPC ............... *F17D 5/06* (2013.01); *G01M 3/08* (2013.01); *G01M 3/18* (2013.01); *G01M 3/243* (2013.01); *G01M 3/28* (2013.01)

(58) Field of Classification Search
None
See application file for complete search history.

(56) References Cited

U.S. PATENT DOCUMENTS 3,508,433 A    4/1970  Bustin
3,691,819 A    9/1972  Guest
(Continued)

FOREIGN PATENT DOCUMENTS

CA    2621035 A1    4/2007
EP    2865457 A1    4/2015
(Continued)

OTHER PUBLICATIONS

[No Author Listed] "Plugging the Gap," (ArabianBusiness.com staff writer) OSI Soft Website article, ,http://www.osisoft.com:80/Resources/Articles/Plugging+the+gap.htm>, Oct. 2, 2007 (3 pages).
(Continued)

*Primary Examiner* — Thomas S McCormack
(74) *Attorney, Agent, or Firm* — Nutter McClennen & Fish LLP

(57) ABSTRACT

In-pipe leak detection systems and related methods are disclosed for detecting in-pipe leaks while fluid is actively flowing through the pipe. The system can include a sensing element coupled to a membrane that are disposed parallel to or in-line with an axial direction of a fluid flow. The membrane is configured to be drawn into contact with the
(Continued)

inner wall in response to a suction force caused by a leak. The leak is detected based on a transient output from the sensing element indicative of a stretch or strain on the membrane. The sensing element and the membrane is coupled to a support structure configured to position the membrane adjacent to an inner wall of a pipe. The support structure can include a mechanism that couples the membrane and the sensing element to the support structure and is configured to help in discriminating between leaks and false detections.

27 Claims, 12 Drawing Sheets

(51) Int. Cl.
   *G01M 3/18*   (2006.01)
   *G01M 3/24*   (2006.01)
   *G01M 3/28*   (2006.01)

(56) References Cited

U.S. PATENT DOCUMENTS

| | | | |
|---|---|---|---|
| 3,967,194 | A | 6/1976 | Beaver et al. |
| 4,646,787 | A | 3/1987 | Rush et al. |
| 4,770,105 | A | 9/1988 | Takagi et al. |
| 4,996,879 | A | 3/1991 | Kruka et al. |
| 5,398,560 | A | 3/1995 | Zollingger et al. |
| 5,675,506 | A | 10/1997 | Savic |
| 5,974,862 | A | 11/1999 | Lander et al. |
| 6,102,617 | A | 8/2000 | Hampton |
| 6,162,171 | A | 12/2000 | Ng et al. |
| 6,237,398 | B1 | 5/2001 | Porat et al. |
| 6,404,189 | B2 | 6/2002 | Kwun et al. |
| 6,530,263 | B1 | 3/2003 | Chana |
| 6,826,948 | B1 | 12/2004 | Bhatti et al. |
| 7,182,025 | B2 | 2/2007 | Ghorbel et al. |
| 8,783,297 | B2 | 7/2014 | Hawwa et al. |
| 8,820,143 | B2 | 9/2014 | Sarma et al. |
| 8,869,588 | B2 | 10/2014 | Calvarese |
| 8,869,599 | B2 | 10/2014 | Ben-Mansour et al. |
| 9,046,427 | B2 | 6/2015 | Hawwa et al. |
| 9,285,290 | B2 | 3/2016 | Chatzigeorgiou et al. |
| 9,321,466 | B2 | 4/2016 | Choi et al. |
| 9,335,233 | B2 | 5/2016 | Khalifa et al. |
| 9,366,596 | B2 | 6/2016 | Mekid et al. |
| 9,464,642 | B2 | 10/2016 | Ilievski et al. |
| 9,721,448 | B2 | 8/2017 | Wu et al. |
| 10,078,031 | B2 | 9/2018 | Youcef-Toumi et al. |
| 10,451,210 | B2 | 10/2019 | Wu et al. |
| 2002/0124633 | A1 | 9/2002 | Yang et al. |
| 2002/0134140 | A1 | 9/2002 | Baumoel |
| 2003/0089267 | A1 | 5/2003 | Ghorbel et al. |
| 2003/0167847 | A1 | 9/2003 | Brown et al. |
| 2004/0128034 | A1 | 7/2004 | Lenker et al. |
| 2005/0126316 | A1 | 6/2005 | Richter et al. |
| 2005/0246112 | A1 | 11/2005 | Abhulimen et al. |
| 2006/0137090 | A1 | 6/2006 | Jeffries et al. |
| 2006/0174707 | A1 | 8/2006 | Zhang |
| 2006/0248966 | A1 | 11/2006 | Houldey et al. |
| 2007/0051165 | A1 | 3/2007 | Maresca et al. |
| 2008/0066812 | A1 | 3/2008 | Tornay |
| 2008/0133063 | A1 | 6/2008 | Bisson et al. |
| 2008/0307877 | A1 | 12/2008 | Cook et al. |
| 2009/0231305 | A1 | 9/2009 | Hotelling et al. |
| 2010/0258362 | A1 | 10/2010 | Trimmer |
| 2012/0041345 | A1 | 2/2012 | Rajamani et al. |
| 2012/0255343 | A1* | 10/2012 | Sarma .............. G01M 3/2807 73/40.5 R |
| 2012/0272722 | A1* | 11/2012 | Khalifa .............. G01M 3/2815 73/40.5 R |
| 2013/0133429 | A1 | 5/2013 | Palma et al. |
| 2013/0186181 | A1 | 7/2013 | Ben-Mansour et al. |
| 2013/0199272 | A1 | 8/2013 | Khalifa et al. |
| 2014/0020450 | A1 | 1/2014 | Hawwa et al. |
| 2014/0130577 | A1* | 5/2014 | Chatzigeorgiou ...... G01M 3/18 73/49.1 |
| 2014/0345367 | A1 | 11/2014 | Mekid et al. |
| 2014/0371624 | A1 | 12/2014 | Ziaie et al. |
| 2015/0330055 | A1 | 11/2015 | Van Opstal et al. |
| 2016/0252110 | A1 | 9/2016 | Galloway et al. |
| 2017/0234759 | A1 | 8/2017 | Youcef-Toumi et al. |
| 2018/0335176 | A1 | 11/2018 | Wu et al. |

FOREIGN PATENT DOCUMENTS

| | | |
|---|---|---|
| GB | 2364126 A | 1/2002 |
| WO | 2004/031719 A1 | 4/2004 |
| WO | 2017/142903 A1 | 8/2017 |
| WO | 2018/075458 A1 | 4/2018 |
| WO | 2018/213033 A1 | 11/2018 |

OTHER PUBLICATIONS

[No Author Listed] "Threats to water availability in Canada.", National Water Research Institute—Meterological Service of Canada, Environment Canada, 2004 (150 pages).
Al-Dhowalia, K. H., et al., "Losses in Riyadh Water Distribution Network," J. King Saud Univ., vol. 6, pp. 17-26, 1994 (9 pages).
Alvarado, P. V. y, et al., "Design of machines with compliant bodies for biomimetic locomotion in liquid environments," Journal of Dynamic Systems, Measurement, and Control, vol. 128, Issue 1, pp. 3-13, Mar. 2006 (11 pages).
Ben-Mansour, R et al., "Computational Fluid Dynamic Simulation of Small Leaks in Water Pipelines for Direct Leak Pressure Transduction," Computers and Fluids, vol. 57, pp. 110-123, 2012 (14 pages).
Chatzigeorgiou, D. M. et al., "Analysis and design of an in-pipe system for water leak detection," ASME 2011 International Design Engineering Technical Conferences and Computers and Information in Engineering, pp. 1007-1016, 2011 (10 pages).
Chatzigeorgiou, D et al., "Design of a novel in-pipe reliable leak detector," IEEE/ASME Transactions on Mechanotronics, vol. 20, Issue 2, pp. 824-833, 2014 (10 pages).
Chatzigeorgiou, D et al., "Design and evaluation of an in-pipe leak detection sensing technique based on force transduction," ASME International Mechanical Engineering Congress and Exposition, 2012 (9 pages).
Chatzigeorgiou, D et al., "Reliable sensing of leaks in pipelines," American Society of Mechanical Engineers Dynamic Systems and Control Conference, 2013 (10 pages).
Cloitre, A et al., "Design and control of a field deployable batoid robot," 2012 4th IEEE RAS & EMBS International Conference on Biomedical Robotics and Biomechanics (BioRob), pp. 707-712, 2012 (6 pages).
Darby et al., "Providing reliable supply of safe drinking water poses challenges," California Agriculture, vol. 54, Issue 5, pp. 69-77, Sep. 2000 (9 pages).
Fletcher, R et al., "Smartball: A new approach in pipeline leak detection.", 2008 7th International Pipeline Conference, American Society of Mechanical Engineers, Sep. 29-Oct. 3, 2008, Calgary, Alberta, Canada (17 pages).
Frutiger, A et al., "Capacitive soft strain sensors via multicore-shell fiber printing," Advanced Materials, vol. 27, No. 15, pp. 2440-2446, 2015 (7 pages).
Hunaidi, O et al., "Acoustical Characteristics of Leak Signals in Plastic Distribution Pipes," Applied Acoustics, vol. 58, pp. 235-254, 1999 (20 pages).
International Search Report for Application No. PCT/US2017/17902, dated Apr. 13, 2017 (12 pages).
International Search Report and Written Opinion for Application No. PCT/US17/56890, dated Feb. 9, 2018 (18 pages).
International Search Report and Written Opinion for Application No. PCT/US18/31317, dated Jul. 26, 2018 (11 pages).
Kurtz, D.W., "Developments in Free-Swimming Acoustic Leak Detection Systems for Water Transmission Pipelines," ASCE Library, American Society of Civil Engineers Pipeline Division Specialty Conference 2006 (7 pages).

(56) References Cited

OTHER PUBLICATIONS

Muth, J.T. et al., "Embedded 3d printing of strain sensors within highly stretchable elastomers," Advanced Materials, vol. 26, Issue 36, pp. 6307-6312, Sep. 2014 (6 pages).

Quarini, J et al., "A review of fluid-driven pipeline pigs and their applications," Proceedings of the Insitution of Mechanical Engineers, Part E: Journal of Process Mechanical Engineering, vol. 221, Issue 1, pp. 1-10, 2007 (10 pages).

Schempf, Hagen et al., "Explorer: Untethered real-time gas main assessment robot system," Process of Int. Workshop on Advances in Service Robots, ASER, vol. 3, 2003 (6 pages).

Shepherd, R. F. et al.,"Multigait soft robot," Proceedings of the National Academy of Sciences, vol. 108, No. 51, pp. 20400-20403, 2011 (4 pages).

Stoianov, I et al., "Pipenet: A wireless sensor network for pipeline monitoring.", Proceedings of the 6th international conference on Information processing in sensor networks, pp. 264-273, 2007 (10 pages).

Tolley, M.T. et al., "A resilient, untethered soft robot," Soft Robotics, vol. 1, No. 3, pp. 213-223, 2014 (11 pages).

Triantafyllou, M. S. et al., "Maneuvering and Control of Marine Vehicles," 2002 (152 pages).

Vickers, A. L., "The future of water conservation: Challenges Ahead," Water Resources Update, Universities Council on Water Resources, Tech Rep 1999 (3 pages).

Vogt, D. M. et al., "Design and characterization of a soft multi-axis force sensor using embedded microfluidic channels," IEEE Sensors Journal, vol. 13, Issue 10, pp. 4056-4064, 2013 (9 pages).

Wu, Y et al., "Design of a Leak Sensor for Operating Water Pipe Systems," The 2017 IEEE/RSJ International Conference on Intelligent Robots and Systems (IROS), Sep. 24-28, 2017 (8 pages).

Wu, Y et al., "Design of a soft passive robot for missions in small diameter water pipe systems," Massachusetts Institute of Technology (7 pages).

Wu, Y et al., "Design of a maneuverable swimming robot for in-pipe missions," 2015 IEEE/RSJ International Conference on Intelligent Robots and Systems (IROS), pp. 4864-4871, 2015 (8 pages).

Yang, J et al., "Leak location using blind system identification in water distribution pipelines," Journal of Sound and Vibration, vol. 310, Nos. 1-2, pp. 134-148, 2008 (15 pages).

European Extended Search Report for Application No. 17862061 dated May 7, 2020 (8 Pages).

* cited by examiner

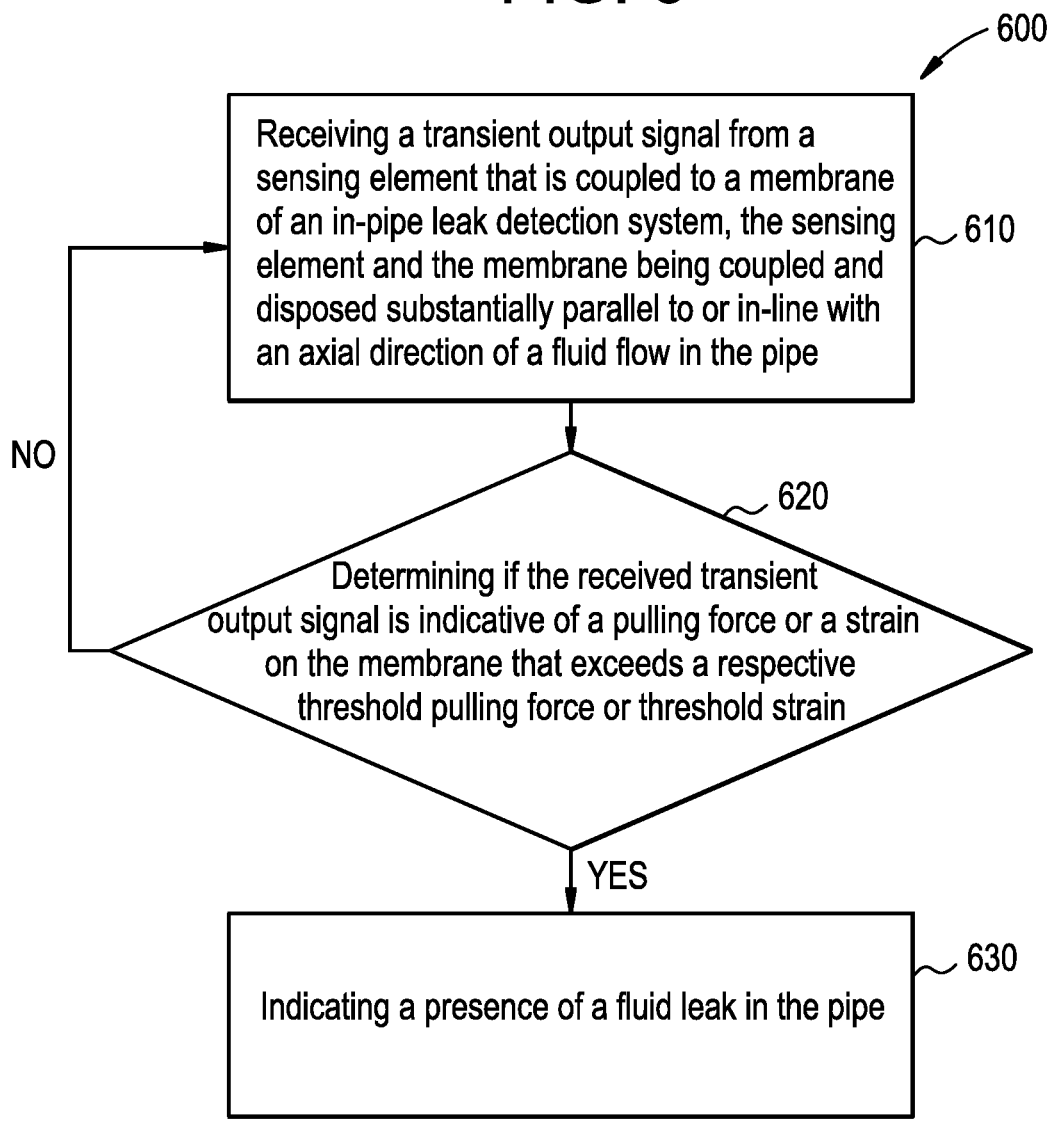

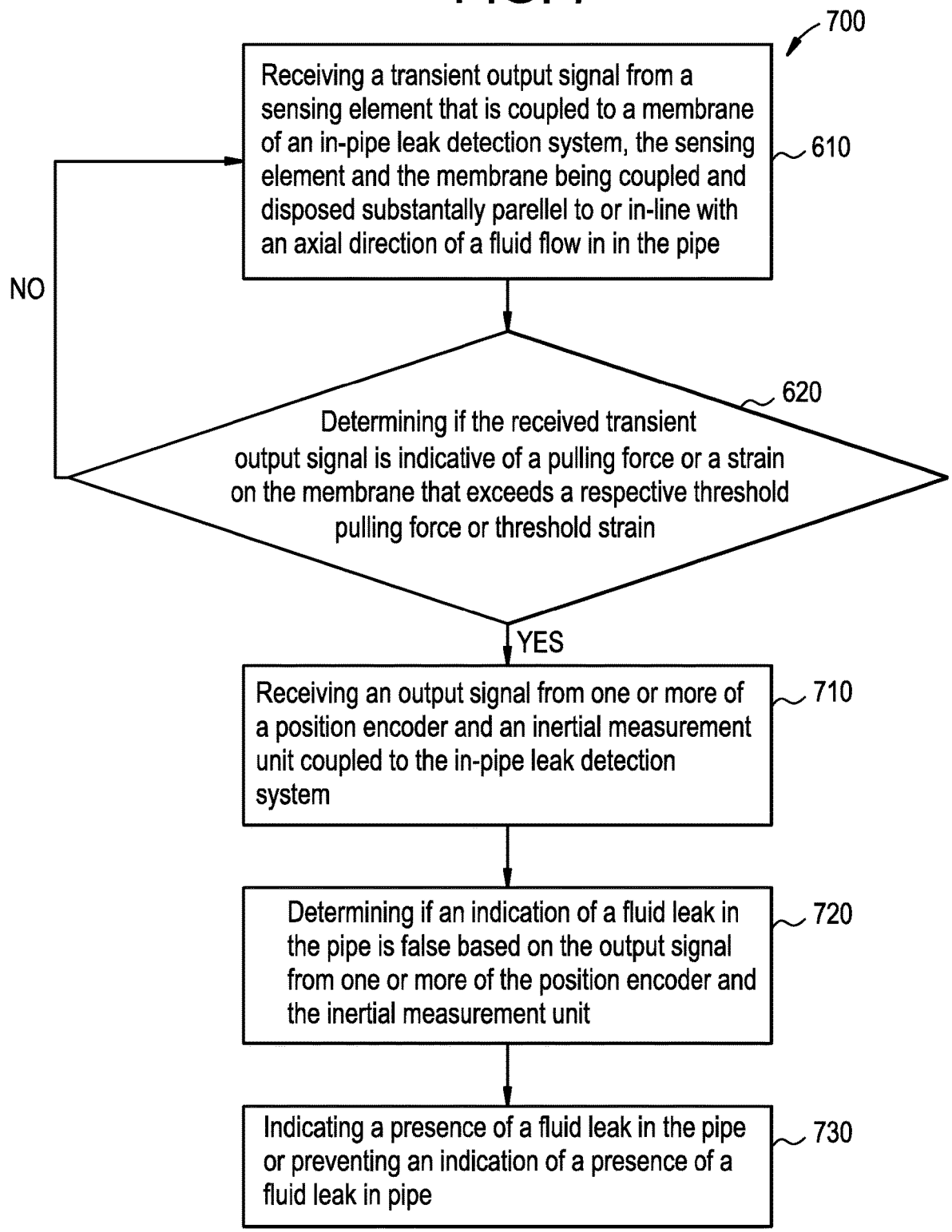

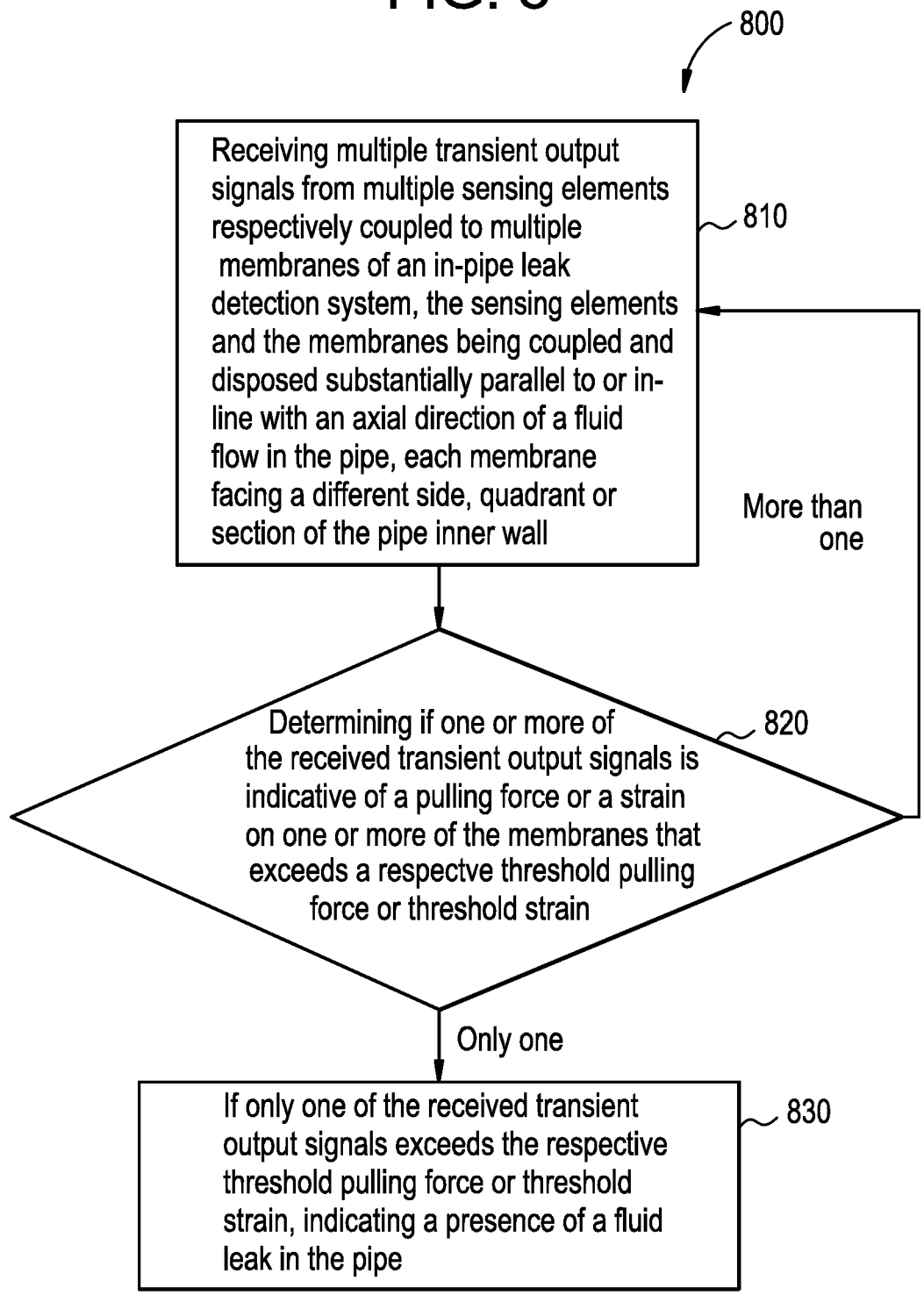

IN-PIPE LEAK DETECTION SYSTEMS, DEVICES, AND METHODS

RELATED APPLICATION(S)

The present application is a U.S. National Stage of and claims priority to International Application No. PCT/US17/56890, filed Oct. 17, 2017, and entitled "IN-PIPE LEAK DETECTION SYSTEMS, DEVICES, AND METHODS," which claims the benefit of and claims priority to U.S. Provisional Patent Application No. 62/409,033, filed Oct. 17, 2016, and entitled "IN-PIPE LEAK DETECTION SYSTEM," the contents of each which is hereby incorporated by reference in their entireties.

FIELD

The present disclosure relates to in-pipe leak detection systems and related methods, and specifically to in-pipe leak detection systems designed for use in pipes with active fluid flows.

BACKGROUND

Pipe leaks cause a significant loss to the clean water supply around the world. It is estimated that around 20% of the clean water produced in most countries is leaked from their distribution networks. Stopping detected leaks saves water as well as the energy and resources consumed during the production of the clean water. Some in-pipe leak detection systems are based on acoustical technologies in which acoustical sensors are used to listen for leaks from inside the pipe. However, such acoustical methods may suffer from issues of low signal-to-ratio, accuracy, and incompatibility with certain pipe materials (e.g., plastics).

Pressure gradient-based technologies are another form of in-pipe leak detection systems. Conceptually, as shown in FIG. 1, a pressure gradient detection method may involve a membrane 110 moving through an interior of a pipe 120. When the membrane arrives at a leak 130 (e.g., a hole or crack in the pipe), a pressure drop on the leak side of the membrane generates a suction force that causes the membrane 110 to press against the pipe wall 105. The system may infer the presence of a leak 130 by detecting an increase in a friction force against the membrane, a change in motion of a device attached to the membrane, or other effect of the suction force. In practice, however, existing pressure gradient-based leak detection systems typically suffer difficulties in detecting leaks in operating water pipe systems with active water flows. As a result, such systems require water service to be shut down during leak inspection. Further, existing pressure gradient-based leak detection systems, as well as other existing types of systems, can trigger false alarms of a leak. In a pressure gradient-based leak detection systems, this can occur, for example, in response to the membrane colliding with obstacles in the pipeline, such as dirt, scales, misaligned pipe connections, and other irregularities.

Accordingly, there is a need for in-pipe leak detection systems, and related methods, that can operate while water is flowing through the pipe, and that can accurately distinguish between leaks and false alarms for leaks (e.g., obstacles). Such systems and methods should also be accurate, consistent, durable, easy to use, among other performance-based features that would be known to be desirable to a person skilled in the art.

SUMMARY

The present disclosure is directed to systems, devices, and methods that allow leaks in pipes to be detected while fluid is actively flowing through the pipe. Further, the disclosures also provide for ways that the systems and devices can discern the difference between a leak and other obstacles that may contained within or may otherwise be part of the pipe (e.g., debris, bends in the pipe, narrowing of the pipe, etc.). More particularly, the disclosed systems and methods include a combination of a membrane and a sensing element that can travel through the pipe in a direction that is substantially parallel to or in-line with an axial direction of a fluid flow in the pipe. The membrane-sensing element combination can be maintained at a particular location with respect to an inner wall of the pipe by a support structure. For example, the support structure can engage the inner wall of the pipe to maintain the location of the membrane and sensing element. The membrane can be configured to be drawn into contact with the inner wall in response to a suction force caused by a fluid leak in the pipe, and the fluid leak can be detected based on a transient output from the sensing element that is indicative of a pulling force or strain on the membrane. Various other systems, devices, and methods, including those designed to easily discern between a fluid leak and an obstacle that is not a fluid leak, are also described herein, among other systems, devices, and methods.

In one exemplary embodiment of an in-pipe leak detection system, the system includes a membrane, a sensing element coupled to the membrane, and a support structure coupled to at least one of the sensing element and the membrane. The sensing element and the membrane are configured to be disposed substantially parallel to or in-line with an axial direction of a fluid flow in a pipe to identify a possible in-pipe leak. The support structure is configured to position the membrane adjacent to an inner wall of a pipe in which a search for an in-pipe leak is being performed. The membrane is configured to be drawn into contact with the inner wall in response to a suction force cause by a fluid leak in the pipe. The fluid leak is detected based on a transient output from the sensing element that is indicative of a pulling force or strain on the membrane.

The membrane and sensing element can be configured to identify a possible in-pipe leak while fluid is actively flowing through the pipe. Similarly, the membrane and sensing element can be configured to identify a possible in-pipe leak while moving through the pipe. The membrane can have a cross-sectional thickness that is configured to maximize the natural frequency of the membrane and the sensing element in response to the stretch in the axial direction of the fluid flow. In some embodiments, a surface of the membrane that faces the inner wall of the pipe can have a cross-sectional area that is configured to minimize the natural frequency of the membrane and the sensing element in response to the stretch a direction substantially perpendicular to the axial direction of the fluid flow. The membrane can have a textured surface that faces the inner wall of the pipe. In some such embodiments, the textured surface can be a dimpled surface that increases a friction force between the membrane and the inner wall when the membrane is drawn into contact with the inner wall.

The sensing element can be embedded in the membrane. In some such embodiments, a stiffness of a region of the membrane containing the embedded sensing element can be lower than a stiffness of a surrounding region of the membrane. The region of the membrane that contains the embedded sensing element can be made, for example, of a first rubber material and a surrounding region of the membrane can be made, for example, of a second rubber material, with a stiffness of the first rubber material being lower than a stiffness of the second rubber material. In some embodiments in which the sensing element is embedded in the membrane, the region of the membrane that contains the embedded sensing element can have a cross-sectional area that is less than a cross-sectional area of a surrounding region of the membrane.

The sensing element can have a variable electrical impedance that is correlated to the pulling force or strain on the membrane. In some such embodiments, the sensing element can include at least one of: a conductive cord, a conductive fabric, a conductive polymer, a conductive composite material, and a stretchable alloy.

The support structure can include a mechanism that couples the membrane, and thereby the sensing element, to the support structure. The mechanism can be configured to artificially dampen a natural frequency of the membrane and the sensing element in response to a stretch in the axial direction of the fluid flow when an obstacle or an extrusion on the inner wall of the pipe pushes the membrane away from the inner wall of the pipe. The mechanism can be further configured such that it does not dampen a natural frequency of the membrane in the same way in response to a stretch in the axial direction of the fluid flow when a fluid leak pulls the membrane towards the inner wall of the pipe. In some embodiments, the mechanism includes a slot that couples the membrane to the support structure. The slot can be configured to artificially dampen the natural frequency of the membrane and the sensing element in response to the stretch in the axial direction of the fluid flow when an obstacle or an extrusion on the inner wall of the pipe pushes the membrane into contact with a bottom of the slot. A flow-driven robot can be coupled to the support structure.

In some embodiments, the support structure can include at least one radially extending support arm having an end coupled to a slot. An outer wall of the end of the support arm can be configured to be in contact with the inner wall of the pipe and maintain the membrane placed inside the slot, and thereby the sensing element, at a substantially fixed distance away from the inner wall of the pipe. A processor can be coupled to the sensing element. The processor can be configured to detect an obstacle or extrusion on the inner wall of the pipe in response to a dominant frequency of the transient output of the sensing element being less than the natural frequency of the membrane and the sensing element in response to the stretch in the axial direction of the fluid flow. In some embodiments that include a processor, the processor can also be configured to detect a fluid leak in response to the dominant frequency of the transient output of the sensing element being equal to or greater than the natural frequency of the membrane and the sensing element in response to the stretch in the axial direction of the fluid flow.

Some systems can include more than one membrane, sensing element, and/or support structure. For example, the system can include a plurality of membranes, a plurality of sensing elements, and a support structure can include a plurality of radially extending support arms. The sensing elements can be respectively coupled to the plurality of membranes, and the radially extending support arms can be respectively coupled to the sensing elements and/or membranes. The plurality of sensing elements and membranes can be configured to be disposed substantially parallel to or in-line with the axial direction of the fluid flow in the pipe to identify a possible in-pipe leak, while respective ends of the radially extending support arms can be configured to expand to be in contact with the inner wall of the pipe in response to pressure from the fluid flow.

In some embodiments, the radially extending support arms can be compressible in response to a reduction in a diameter of the pipe or other obstacle(s), and expandable in response to an increase in a diameter of the pipe. The arms can be configured to be in contact with the inner wall of the pipe and maintain the membranes at one or more substantially fixed distances away from the inner wall. In some embodiments, the arms can be respectively coupled to the sensing elements and/or membranes in a manner that the membranes substantially cover a circumference of the inner wall of the pipe.

Systems that include multiple membranes and/or sensing elements can also include at least one processor coupled to the sensing elements. The processor(s) can be configured to discriminate between a fluid leak and a false leak detection based on a comparison of a plurality of concurrent transient outputs from the sensing elements. For example, the processor(s) can be configured to detect a false fluid leak in response to more than one of the concurrent transient outputs from the sensing elements being indicative of a pulling force or strain on the membrane. By way of further example, the processor(s) can be configured to detect a fluid leak in response to one of the concurrent transient outputs from the sensing elements being indicative of a pulling force or strain on the membrane.

The system can also include at least one of a position encoder(s) and an inertial measurement unit(s). The position encoder(s) can be coupled to the radially extending support arms, and a processor can be configured to detect a false fluid leak in response to the position encoder(s) outputting a signal indicating a change in a position of at least one of the radially extending support arms. Likewise, in embodiments in which an inertial measurement unit(s) is included, a processor can be coupled to the inertial measurement unit(s) and can be configured to detect a false fluid leak in response to the inertial measurement unit(s) outputting a signal indicating a change in a rotational speed of the system.

Another exemplary embodiment of an in-pipe leak detection system includes a membrane, a sensing element embedded in the membrane, and a support structure. The support structure is coupled to at least one of the sensing element and the membrane and is configured to position the membrane adjacent to an inner wall of a pipe in which a search for an in-pipe leak is being performed. The membrane is configured to be drawn into contact with the inner wall in response to a suction force caused by a fluid leak in the inner wall. The fluid leak is detected based on a transient output indicative of a pulling force or strain on the membrane from the sensing element.

The membrane and sensing element can be configured to identify a possible in-pipe leak while fluid is actively flowing through the pipe. Similarly, the membrane and sensing element can be configured to identify a possible in-pipe leak while moving through the pipe. The membrane can have a cross-sectional thickness that is configured to maximize the natural frequency of the membrane and the sensing element in response to the stretch in the axial direction of the fluid flow. In some embodiments, a surface of the membrane that faces the inner wall of the pipe can have a cross-sectional area that is configured to minimize the natural frequency of the membrane and the sensing element in response to the stretch in the axial direction of the fluid flow. The membrane can have a textured surface that faces the inner wall of the pipe. In some such embodiments, the textured surface can be a dimpled surface that increases a friction force between the membrane and the inner wall when the membrane is drawn into contact with the inner wall.

In some embodiments, a stiffness of a region of the membrane containing the embedded sensing element can be lower than a stiffness of a surrounding region of the membrane. The region of the membrane that contains the embedded sensing element can be made, for example, of a first rubber material and a surrounding region of the membrane can be made, for example, of a second rubber material, with a stiffness of the first rubber material being lower than a stiffness of the second rubber material. In some embodiments in which the sensing element is embedded in the membrane, the region of the membrane that contains the embedded sensing element can have a cross-sectional area that is less than a cross-sectional area of a surrounding region of the membrane.

The sensing element can have a variable electrical impedance that is correlated to the pulling force or strain on the membrane. In some such embodiments, the sensing element can include at least one of: a conductive cord, a conductive fabric, a conductive polymer, a conductive composite material, and a stretchable alloy.

The support structure can include a mechanism that couples the membrane, and thereby the sensing element, to the support structure. The mechanism can be configured to artificially dampen a natural frequency of the membrane and the sensing element in response to the stretch in the axial direction of the fluid flow when an obstacle or an extrusion on the inner wall of the pipe pushes the membrane away from the inner wall of the pipe. The mechanism may be further configured such that it does not dampen a natural frequency of the membrane in the same way in response to a stretch in the axial direction of the fluid flow when a fluid leak pulls the membrane towards the inner wall of the pipe. In some embodiments, the mechanism includes a slot that couples the membrane to the support structure. The slot can be configured to artificially dampen the natural frequency of the membrane and the sensing element in response to the stretch in the axial direction of the fluid flow when an obstacle or an extrusion on the inner wall of the pipe pushes the membrane into contact with a bottom of the slot. A flow-driven robot can be coupled to the support structure.

In some embodiments, the support structure can include at least one radially extending support arm having an end coupled to a slot. An outer wall of the end of the support arm can be configured to be in contact with the inner wall of the pipe and maintain the membrane placed inside the slot, and thereby the sensing element, at a substantially fixed distance away from the inner wall of the pipe. A processor can be coupled to the sensing element. The processor can be configured to detect an obstacle or extrusion on the inner wall of the pipe in response to a dominant frequency of the transient output of the sensing element being less than the natural frequency of the membrane and the sensing element in response to the stretch in the axial direction of the fluid flow. In some embodiments that include a processor, the processor can also be configured to detect a fluid leak in response to the dominant frequency of the transient output of the sensing element being equal to or greater than the natural frequency of the membrane and the sensing element in response to the stretch in the axial direction of the fluid flow.

Some systems can include more than one membrane, sensing element, and/or support structure. For example, the system can include a plurality of membranes, a plurality of sensing elements, and a support structure can include a plurality of radially extending support arms. The sensing elements can be respectively coupled to the plurality of membranes, and the radially extending support arms can be respectively coupled to the sensing elements and/or membranes. The plurality of sensing elements and membranes can be configured to be disposed substantially parallel to or in-line with the axial direction of the fluid flow in the pipe to identify a possible in-pipe leak, while respective ends of the radially extending support arms can be configured to expand to be in contact with the inner wall of the pipe in response to pressure from the fluid flow.

In some embodiments, the radially extending support arms can be compressible in response to a reduction in a diameter of the pipe or other obstacle(s), and expandable in response to an increase in a diameter of the pipe. The arms can be configured to be in contact with the inner wall of the pipe and maintain the membranes at one or more substantially fixed distances away from the inner wall. In some embodiments, the arms can be respectively coupled to the sensing elements and/or membranes in a manner that the membranes substantially cover a circumference of the inner wall of the pipe.

Systems that include multiple membranes and/or sensing elements can also include at least one processor coupled to the sensing elements. The processor(s) can be configured to discriminate between a fluid leak and a false leak detection based on a comparison of a plurality of concurrent transient outputs from the sensing elements. For example, the processor(s) can be configured to detect a false fluid leak in response to more than one of the concurrent transient outputs from the sensing elements being indicative of a pulling force or strain on the membrane. By way of further example, the processor(s) can be configured to detect a fluid leak in response to one of the concurrent transient outputs from the sensing elements being indicative of a pulling force or strain on the membrane.

The system can also include at least one of a position encoder(s) and an inertial measurement unit(s). The position encoder(s) can be coupled to the radially extending support arms, and a processor can be configured to detect a false fluid leak in response to the position encoder(s) outputting a signal indicating a change in a position of at least one of the radially extending support arms. Likewise, in embodiments in which an inertial measurement unit(s) is included, a processor can be coupled to the inertial measurement unit(s) and can be configured to detect a false fluid leak in response to the inertial measurement unit(s) outputting a signal indicating a change in a rotational speed of the system.

One exemplary embodiment of a method of detecting a fluid leak in a pipe includes receiving a transient output signal from a sensing element that is coupled to a membrane of an in-pipe leak detection system disposed in a pipe. The sensing element and the membrane are coupled and are disposed substantially parallel to or in-line with an axial direction of a fluid flow in the pipe. The method further includes determining if the received transient output signal is indicative of a pulling force or a strain on the membrane that exceeds a respective threshold pulling force or threshold strain. If the received transient output signal is determined to be indicative of a pulling force or a strain on the membrane that exceeds a respective threshold pulling force or threshold strain, a presence of a fluid leak in the pipe is indicated.

In some embodiments, the transient output signal from the sensing element is a transient voltage signal that represents a change in an electrical impedance of the sensing element. In such embodiments, determining if the received transient output signal is indicative of a pulling force or strain on the membrane that exceeds the respective threshold pulling force or threshold strain can include converting the transient voltage signal into a transient signal that represents a pulling force or a strain on the membrane based on a predetermined relationship between impedance and pulling force or strain for the sensing element, and determining whether the transient signal that represents the pulling force or the strain on the membrane includes one or more of a magnitude and dominant frequency that exceeds the respective threshold pulling force or the threshold strain. If the one or more of the magnitude and the dominant frequency exceeds the respective threshold pulling force or threshold strain, a presence of a fluid leak in the pipe can be indicated.

The method can include receiving an output signal from one or more position encoders and/or one or more inertial measurement units coupled to the in-pipe leak detection system, and determining if an indication of a fluid leak in the pipe is false based on the output signal from one or more of the position encoder(s) and the inertial measurement unit(s). If the indication of a fluid leak in a pipe is determined to be false, the method can include either indicating no presence of a fluid leak in the pipe or preventing an indication of a presence of a fluid leak in the pipe. In some embodiments, the threshold pulling force or the threshold strain can be one or more of a magnitude and a dominant frequency of the transient output signal.

In some embodiments, the method can include receiving a plurality of transient output signals from a plurality of sensing elements respectively coupled to a plurality of membranes of the in-pipe leak detection system. The sensing element and the membranes can be coupled and disposed substantially parallel to or in-line with the axial direction of the fluid flow in the pipe. The method can further include determining if one or more of the receive transient output signals is indicative of a pulling force or a strain on one or more of the plurality of membranes that exceeds the respective threshold pulling force or threshold strain. A presence of a fluid leak in the pipe can be indicated if only one of the plurality of received transient output signals exceeds the respective threshold pulling force or threshold strain. In some such embodiments, each of the plurality of transient output signals from the plurality of sensing elements can be a transient voltage signal that represents a change in an electrical impedance of a respective sensing element. In such embodiments, determining if one or more of the received transient output signals is indicative of a pulling force or a strain on one or more of the plurality of membranes that exceeds the respective threshold pulling force or threshold strain can include converting the transient voltage signals into a plurality of transient signals that represent pulling forces or strains on the plurality of membranes based on a predetermined relationship between impedance and pulling force or strain for the plurality of sensing elements. The determining step can further include determining whether one or more of the transient signals that represent the pulling forces or the strains on the plurality of membranes includes one or more of a magnitude and a dominant frequency that exceed the respective threshold pulling force or threshold strain. If only one of the plurality of received transient output signals is determined to be indicative of a pulling force or a strain that exceeds the respective threshold pulling force or threshold strain, a presence of a fluid leak in the pipe can be indicated.

The sensing element can measure one or more parameters to determine the transient output signal that is provided by the sensing element and is subsequently received, and the fluid flow in the pipe can be active when the parameter(s) is measured by the sensing element. In some embodiments, the method can include disposing a flow-driven robot in the pipe to move the in-pipe leak detection system through the pipe to identify a possible in-pipe leak.

Another exemplary embodiment of detecting a fluid leak in a pipe includes receiving a transient output signal from a sensing element that is coupled to a membrane of an in-pipe leak detection system disposed in a pipe, and determining whether the transient output signal from the sensing element is indicative of a pulling force or strain on the membrane that exceeds a respective threshold pulling force or threshold strain. If the transient output signal is indicative of a pulling force or a strain on the membrane that exceeds the threshold pulling force of the threshold strain, the method includes comparing a dominant frequency of the transient output of the sensing element to a natural frequency of the membrane and the sensing element in response to the stretch in the axial direction of the fluid flow. The method further includes determining whether a fluid leak or a false fluid leak is present in the pipe based on the comparison of the dominant frequency of the transient output of the sensing element and the natural frequency of the membrane and the sensing element in response to the stretch in the axial direction of the fluid flow.

Determining whether a fluid leak or a false fluid leak is present in the pipe can include detecting a fluid leak in response to determining that the dominant frequency of the transient output of the sensing element is equal to or greater than the natural frequency of the membrane and the sensing element in response to the stretch in the axial direction of the fluid flow. Alternatively, or additionally, determining whether a fluid leak or a false fluid leak is present in the pipe can include detecting a false fluid leak in response to determining that the dominant frequency of the transient output of the sensing element is less than the natural frequency of the membrane and the sensing element in response to the stretch in the axial direction of the fluid flow.

In some embodiments, the transient output signal from the sensing element is a transient voltage signal that represents a change in an electrical impedance of the sensing element. In such embodiments, determining whether the transient output signal from the sensing element is indicative of a pulling force or strain on the membrane that exceeds a respective threshold pulling force or threshold strain can include converting the transient voltage signal into a transient signal that represents a pulling force or a strain on the membrane based on a predetermined relationship between impedance and pulling force or strain for the sensing element, and determining whether the transient signal that represents the pulling force or the strain on the membrane includes one or more of a magnitude and a dominant frequency that exceeds the respective threshold pulling force or threshold strain. If the one or more of the magnitude and the dominant frequency exceeds the respective threshold pulling force or threshold strain, a presence of a fluid leak in the pipe can be indicated.

The sensing element and the membrane can be disposed substantially parallel to or in-line with an axial direction of a fluid flow in the pipe to identify a possible in-pipe leak. In some embodiments, the sensing element can measure one or more parameters to determine the transient output signal that is provided by the sensing element and is subsequently received, and the fluid flow in the pipe can be active when the parameter(s) is measured by the sensing element. In some embodiments, the method can include disposing a flow-driven robot in the pipe to move the in-pipe leak detection system through the pipe to identify a possible in-pipe leak.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments:

FIG. 6 illustrates one exemplary embodiment of a method of detecting a fluid leak in a pipe and discriminating between fluid leaks and false fluid leaks;

FIG. 7 illustrates another exemplary embodiment of a method of detecting a fluid leak in a pipe and discriminating between fluid leaks and false fluid leaks;

FIG. 8 illustrates another exemplary embodiment of a method of detecting a fluid leak in a pipe and discriminating between fluid leaks and false fluid leaks;

DETAILED DESCRIPTION

Figure 1:
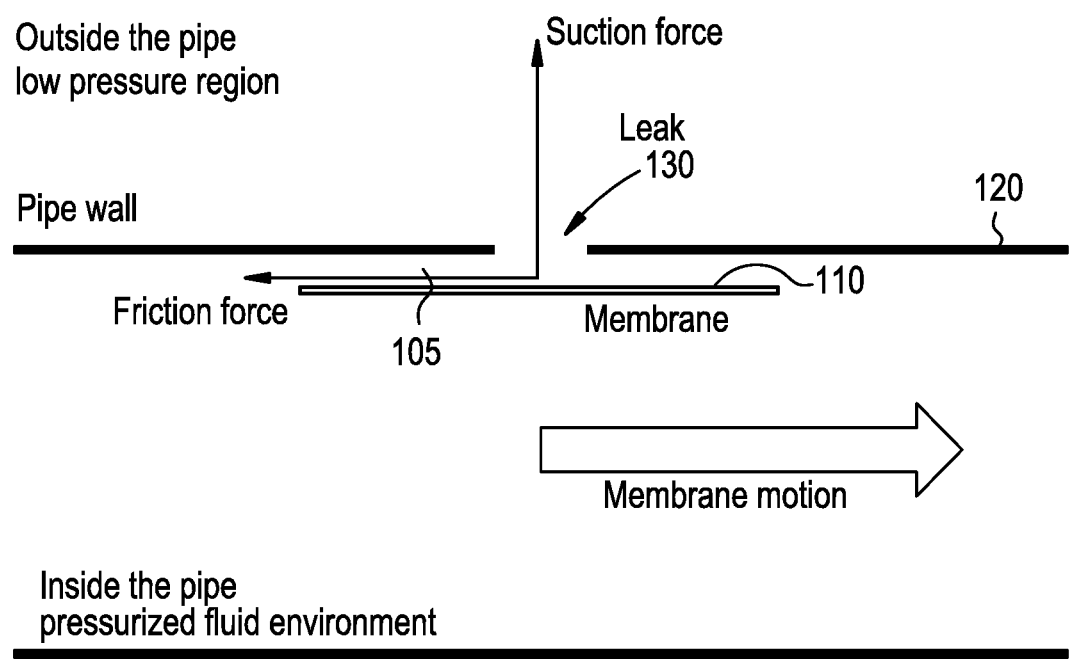
FIG. 1 is a schematic illustration showing the general concept of pressure gradient-based, in-pipe leak detection as known in the prior art.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-numbered components of various embodiments generally have similar features when those components are of a similar nature and/or serve a similar purpose. A person skilled in the art, in view of the present disclosure, will understand various instances in which like-numbered components across various figures are akin.

The present disclosure is directed to various systems, devices, and methods that are configured to allow in-pipe leaks to be detected while water is actively flowing through a pipe, and further, to discern the difference between the existence of a leak and the existence of an obstacle in the pipe. The various systems, devices, and methods may also be used to allow in-pipe leaks to be detected while other fluids and/or gases is actively flowing through a pipe without departing from the spirit of the present disclosure. The systems, devices, and methods provide for a configuration in which a membrane and a sensing element are disposed in a direction of a flow of fluid through the pipe, i.e., the membrane and sensing element are in-line with or approximately parallel to a direction of flow through the pipe, and one or more parameters measured by the sensing element can be used to detect the existence of a leak. Additionally, features have been incorporated into the systems, devices, and methods that allow for parameters that otherwise may be indicative of a leak in a pipe to be identified as a false-identification of a leak that may have been created, for example, by some form of an obstacle in the pipe (e.g., dirt, rust, tuberculation, extrusion, other object, elbow or bend in the pipe, etc.).

In active flow environments of a pipe, like those in which the present disclosure is designed to operate, a membrane of leak-detecting systems or devices provided for herein can move through the pipe at approximately the speed of the fluid flow. While moving with the fluid flow, a friction force that stretches or strains the membrane as the leak detection system passes a leak may be similar to a high frequency input or an impulse input. Existing in-pipe leak detection systems, hindered by the inertia of the fluid around them, are incapable of reacting to such high frequency inputs and thus cannot detect in-pipe leaks while moving with active fluid flows. An active fluid flow may be characterized by a flow speed that is approximately 0.1 m/s and greater. Typical active water flows observed in some city water distribution systems may have a flow speed approximately in the range of about 0.4 m/s to about 1 m/s, although flow speeds used in conjunction with the present disclosures can be faster or slower than that range. As a result, existing low bandwidth leak detection systems can only operate in static flow environments in which there is no fluid flow or the flow rate is negligible.

Various embodiments of in-pipe leak detection systems and devices, and related methods, configured to detect in-pipe leaks in operating fluid pipe systems while moving with active fluid flows are provided for in the present disclosure. The systems and devices may be further configured to detect small leaks in the pipe in which an induced pressure gradient is localized in a region near a leak. Further, the systems and devices may be configured to adapt to various obstacles or extrusions on an inner wall of a pipe as the systems or devices moves through the pipe. Still further, the systems and devices may be further configured to discriminate between leaks and obstacles in the pipe that may create false leak detections. The systems, devices, and methods provided for herein can be used in most any known fluid, including but not limited to water, gas, and oil.

Figure 2:
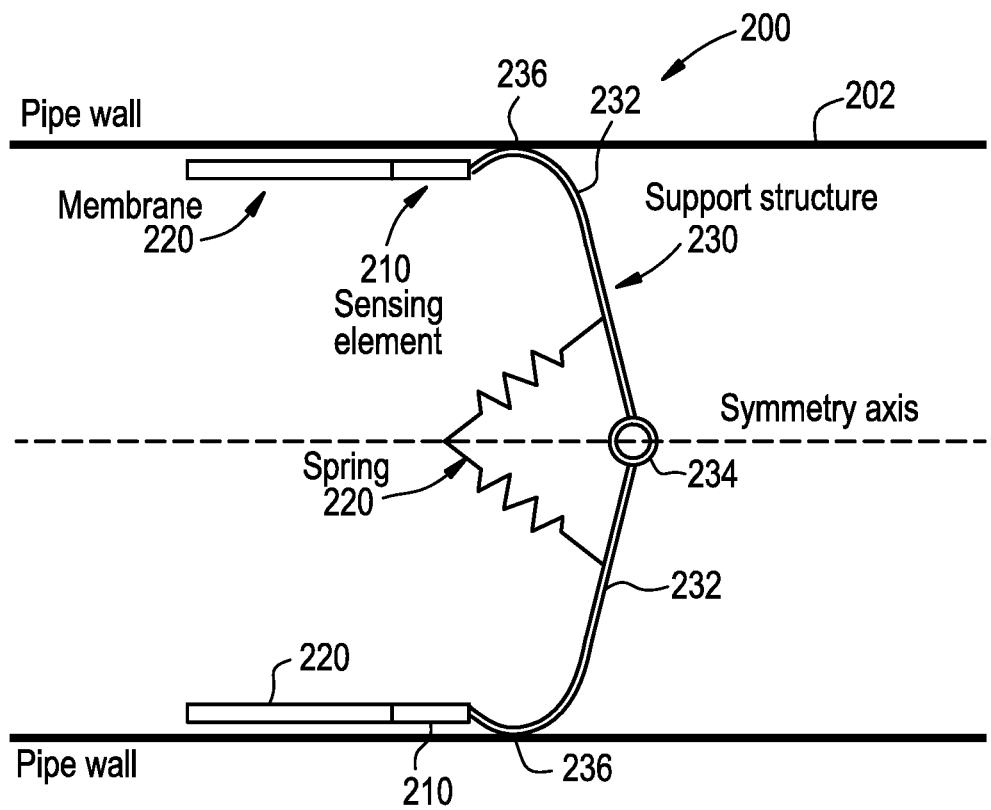
FIG. 2 is a schematic illustration of one exemplary embodiment of an in-pipe leak detection system.

FIG. 2 is a schematic illustration of one exemplary embodiment of an in-pipe leak detection system 200. As determinable from additional discussions and descriptions, the illustrated schematic diagram can be considered a cross-section of some of the systems provided for in the present disclosure (e.g., the system illustrated in FIG. 12). As shown, the system 200 includes sensing elements 210, membranes 220, and a support structure 230. The membranes 220 may be configured to stretch or strain in response to a pulling force on the membrane. For example, when the membrane 220 encounters a leak on the wall of a pipe 202, the pressure gradient at the source of the leak creates a suction force that draws the membrane 220 into contact with the inner wall of the pipe. As the system 200 continues to move in an axial direction of the fluid flow (e.g., left to right in FIG. 2), the friction force of the inner wall pulls against the membrane 220, causing the membrane to stretch and/or strain.

To detect the stretch or strain on the membranes, the sensing elements 210 are coupled to the membranes 220. The sensing elements 210 may be force sensors configured to detect a pulling force that stretches the membrane. The sensing elements 210 may alternatively, or additionally, be displacement sensors that detect a strain or deformation of the membrane caused by the pulling force stretching the membrane. For example, the sensing elements 210 may be made of a material having one or more electrical properties (e.g., impedance) correlated to an applied stretch or strain. Accordingly, the stretch or strain on a membrane 220 may be detected by applying the stretch or strain experienced by the membrane to a corresponding sensing element 210 and measuring changes in impedance or other electrical property of the sensing element in response to the applied stretch or strain. In some embodiments, the measured changes in impedance may be converted to a corresponding stretch (force) or strain (displacement) signals according to predetermined relationship or correlation associated with the geometry and material of the sensing element. A person skilled in the art will recognize other types of sensing elements that can be used, as well as other parameters that can be measured, in view of the present disclosures, and use of such sensing elements and parameters does not depart from the spirit of the present disclosure.

As previously discussed, when a membrane moves with an active fluid flow, the stretch or strain on the membrane may be characterized as a high frequency input or impulse. To enable the sensing elements 210 to detect such high frequency inputs, the sensing element 210 and the membrane 220 may be disposed substantially parallel to or in-line with an axial direction of a fluid flow in a pipe 202. For example, a sensing element 210 may be embedded or directly coupled to a respective membrane 220 that is disposed substantially parallel to or in-line with an axial direction of the fluid flow. The membrane 220 and the embedded sensing element 210 may be disposed substantially parallel or in-line with the axial direction of the fluid flow by its primary surface (i.e., the surface having a large cross-sectional area) to face a side, quadrant, or other section of the inner pipe wall. Accordingly, by aligning the sensing elements 210 and the membranes 220 with the fluid flow, motions of the sensing elements 210 and the membranes 220 in the axial direction of the flow are minimally hindered by the inertia of the fluid. This allows the sensing elements 210 and the membranes 220 to stretch more easily in the axial direction of the fluid flow and detect high frequency impulses of stretch or strain on the membranes as the system 200 moves with an active fluid flow.

The support structure 230 may be coupled to the sensing elements 210 and/or the membranes 220 and configured to position the membranes 220 adjacent to an inner wall of the pipe 202. The support structure 230 may be a spring-loaded, umbrella-like structure that is configured to expand or compress to adapt to changes in pipe diameter and other obstacles or extrusions encountered in the pipe 202. For example, the support structure 230 may include support arms or shafts 232 that extend radially from a common hub 234. When a fluid flows in the pipe 202, the fluid flow may push the support structure 230 such that the radially extending support arms 232 expand and thereby maintain contact with the inner wall of the pipe 202 as the system 200 moves through the pipe. Conversely, when the system 200 encounters an obstacle (e.g., pipe diameter reduction), the obstacle and/or a fluid flow may push down on one or more the radially extending support arms 232, thereby compressing the support structure 230. One or more position encoders may be coupled to the support arms 232 to monitor the configuration of the support arms 232 as the support arms 232 extend or compress, and thus indicate the diameter change of the pipe 202 and the presence of obstacles. The sensing elements 210 and/or the membranes 220 may be attached to the terminal ends 236 of the radially extending support arms 232.

The sensing elements 210 may be placed between the membrane 220 and the support structure 230 to measure the relative stretch or strain between the membrane 220 and the support structure 230 with the highest sensitivity. The membrane 220 may be disposed substantially parallel to or in-line with an axial direction of a fluid flow in a pipe 202 and the motion or displacement of the membrane 220 in the axial direction of the fluid flow is minimally hindered by the inertia of the fluid. So when the membrane 220 is pulled in the axial direction of the fluid flow, the membrane 220 may stretch or strain easily in the axial direction of the fluid flow. In contrast, the support structure 230 may be disposed substantially perpendicular to the axial direction of the fluid flow in the pipe 202, and the motion or displacement of the support structure 230 in the axial direction of the fluid flow is greatly hindered by the inertia of the fluid around the support structure 230. Therefore, the support structure 230 may move negligibly against the axial direction of the fluid flow when the pulling force on the membrane 220 is transferred to the support structure 230. When the sensing elements 210 are placed between the membrane 220 (which stretch or strain easily in the axial direction of the fluid flow) and the support structure 230 (which negligibly moves against the axial direction of the fluid flow), the sensing elements 210 can easily detect the relative stretch or strain between the membrane 220 and the support structure 230 even if a small pulling force is present on the membrane.

Although FIG. 2 illustrates only two membranes 220 and two sensing elements 210 extending from two radially extending arms 232, any number of membranes, sensing elements, and arms can be used without departing from the spirit of the present disclosure. The number of membranes 220, sensing elements 210, and radially extending support arms 232 may be selected to cover the entire circumference of a pipe cross-section for leak detection. For example, if each membrane 220 spans 90 degrees of a circle, the support structure 230 may include four radially extending arms 232 coupled to four sensing elements 210 and four membranes 220 to substantially cover each quadrant of the pipe cross-section. Each membrane 220 and sensing element 210 couple may be configured to detect leaks in a quadrant of the pipe cross section that the membrane 220 covers and indicate that the radial position of the leak is within that quadrant. Such a configuration is discussed in greater detail below at least with respect to FIGS. 13A and 13B. The circumference of the pipe cross-section may be divided into a more than four quadrants if more accurate radial position of the leak is desired. Likewise, optionally, additional membranes and sensing elements can be layered on top of another and/or placed in openings disposed between adjacent membranes to fill-in any gaps that may exist between membranes.

Figure 3:
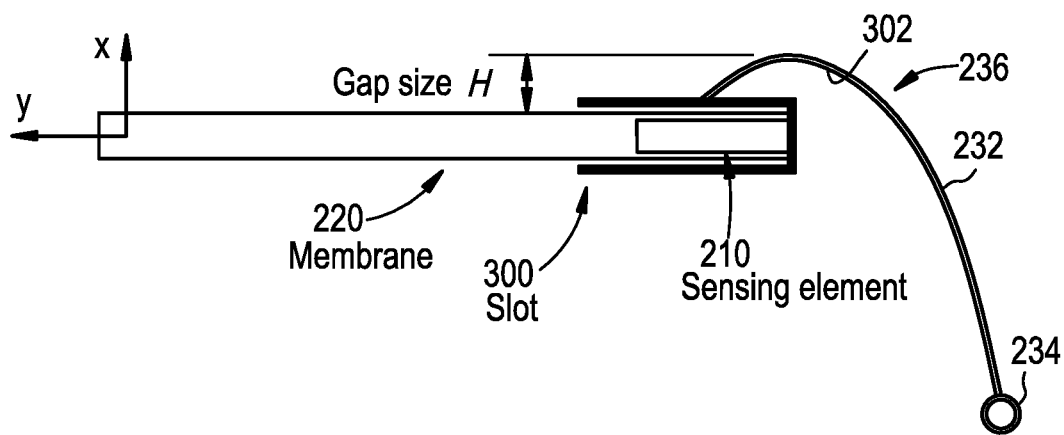
FIG. 3 is a schematic illustration of one exemplary embodiment of a coupling mechanism disposed between some combination of a sensing element and membrane and a support structure, each of the sensing element, membrane, and support structure being from the in-pipe leak detection system of FIG. 2.

FIG. 3 is a schematic illustration of one exemplary embodiment of a coupling mechanism disposed between some combination of a sensing element 210 and membrane 220 and a support structure 230. As shown, a rigid slot structure 300 may be connected to a terminal end 236 of the radially extending arm 232. The rigid slot structure 300 may be configured to receive and loosely hold the membrane 220 and/or the sensing element 210 coupled thereto. The terminal end 236 of the radially extending arm 232 and the rigid slot structure 300 may be further configured to position the membrane 220 and the sensing element 210 placed inside the slot structure away from the inner wall of the pipe 202 at a substantially fixed distance or gap size H. The term substantially is used in this context, and in other contexts herein, as a person skilled in the art will recognize there may be a negligible amount of movement that may occur while the system 200 is traveling.

The gap size H between the membrane 220 and the inner wall may be configured to enable detection of small leaks, including small leaks in low pressure pipes. For example, with small leaks, the induced rapid pressure drop may be restricted within a small region near the leak. Accordingly, the gap size may be configured to maintain the membrane 220 and the sensing element 210 placed inside the slot at a substantially fixed distance that is as close as possible to the inner wall of the pipe 202 without contacting the wall. The gap size can depend on a variety of factors, including but not limited to a size and configuration of the pipe in which the system 200 is being used, a size and configuration of the various components used in the system 200, a flow rate, a low line pressure amount, and a size of possible known obstacles, defects, and leaks. Additionally, to the extent the gap size is designed to be a fixed distance, a person skilled in the art will recognize that the gap size may change in use as the system 200 moves through a pipe. Such movement is understood to be encompassed by the designed gap size (e.g., a gap size of approximately 2 mm can vary above and below that gap size a reasonable amount, such as about 0.1 mm, 0.2 mm, etc.). A gap size H can be approximately in the range of about 0.5 mm to about 5 mm, and in some exemplary embodiments the gap size H is about 2 mm to detect leaks caused by holes having an average diameter size of approximately 4 mm and having a low line pressure approximately in the range of about 0.8 bars to about 2 bars. Other gap sizes and pressures may also be used without departing from the spirit of the present disclosure.

To create the gap, the terminal end 236 of the radially extending support arm 232 may be bent. For example, FIG. 3 shows the terminal end 236 of the support arm 232 having a bend that is approximately 90 degrees, although other angle ranges are possible. Accordingly, when the support structure 230 is in its expanded state, a peak of a bend 302 may be in direct contact with the inner wall as the system 200 moves with the active flow through the pipe 202. Thus, the gap size H may be configured to be the distance between the peak of the bend 302 and the rigid slot structure 300 plus the thickness of the top of the rigid slot structure 300 that is adjacent to the inner wall.

FIG. 4A through 4D illustrate the capabilities of the system 200 to mechanically discriminate between a fluid leak and a false detection of a leak. More particularly, to enable the system 200 to discriminate between a fluid leak and an obstacle or an extrusion that may trigger a false detection, the rigid slot structure 300 may be configured to artificially dampen the membrane's natural frequency in response to a stretch in the axial direction of the fluid flow when the obstacle or extrusion engages collides or otherwise engages the membrane. A membrane's natural frequency is the frequency at which the membrane and the sensing element naturally oscillates in the presence of a fluid flow (e.g., water, gas, etc.) after the membrane and sensing element are related from a stretched state.

Figure 4A:
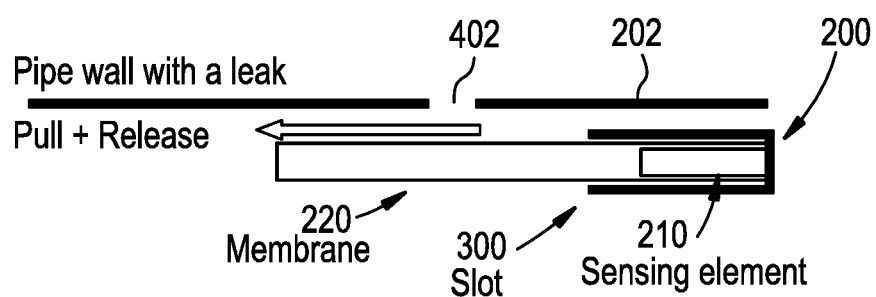
FIG. 4A is a schematic illustration of the coupling mechanism, sensing element, and membrane of the in-pipe leak detection system of FIG. 3 being used in a pipe having a leak in a wall of the pipe.
Figure 4B:
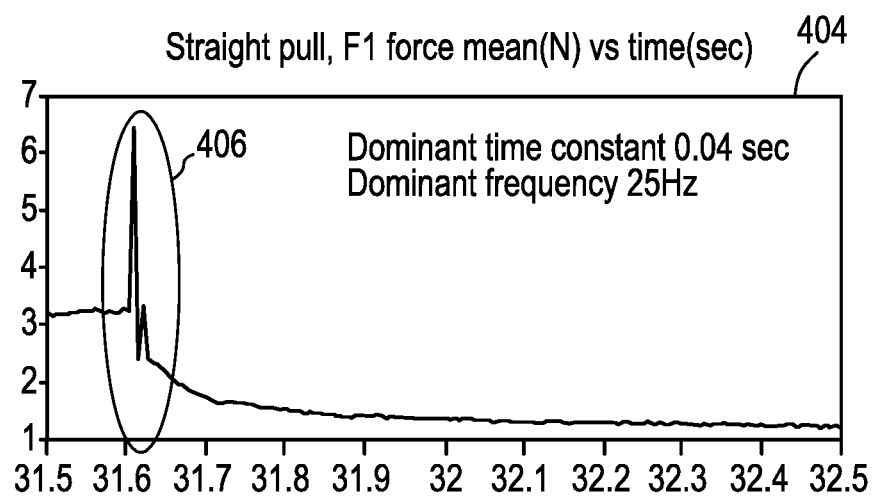
FIG. 4B is a graph illustrating one example of a straight pull force experienced by a portion of the in-pipe leak detection system of FIG. 4A over time.

For example, as shown in FIG. 4A, when a suction force is caused by a fluid leak 402, the membrane 220 may be drawn into contact with the inner wall of the pipe 202 and stretch in response to being pulled by the friction of the inner wall, while the entire system 200 moves with the fluid flow (e.g., to the right in FIG. 4A). Since the entire system 200 is moving, the pull on the membrane 220 is temporary and the membrane 220 will be released from the pull right after the membrane 220 passes the fluid leak 402 completely. Because the membrane 220 and the sensing element 210 are loosely held by the rigid slot structure 300, the membrane's movement toward the inner wall of the pipe 202 is too small to cause any high friction contact between the slot 300 and the membrane 220 or the sensing element 210, the membrane 220 and the sensing element 210 may oscillate in the axial direction of the fluid flow at its natural frequency. Thus, as shown in the graph 404 of FIG. 4B, the transient response 406 generated by the sensing element 210 in response to a quick pull and then release on the membrane 220 in the axial direction of the fluid flow may also have a dominant frequency equal to a combined natural frequency (e.g., about 25 Hz) of the membrane 220 and the sensing element 210 in response to a stretch in the axial direction of the fluid flow.

Figure 4C:
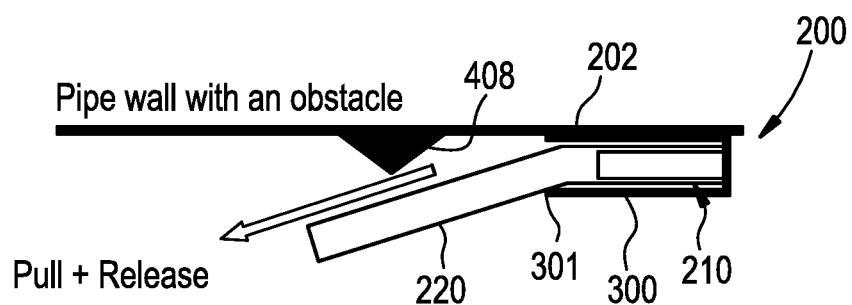
FIG. 4C is a schematic illustration of the coupling mechanism, sensing element, and membrane of the in-pipe leak detection system of FIG. 3 being used in a pipe having no leak in a wall of the pipe, but having an obstacle disposed proximate to an inner wall of the pipe.
Figure 4D:
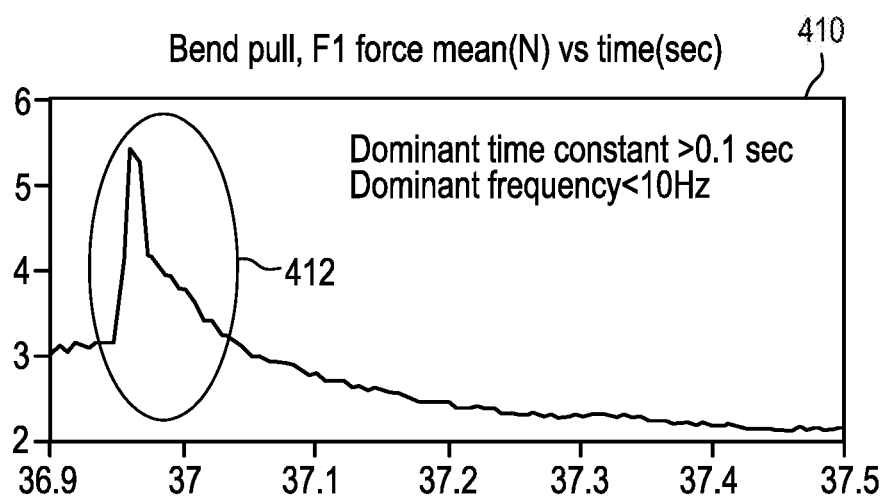
FIG. 4D is a graph illustrating one example of a bend pull force experienced by a portion of the in-pipe leak detection system of FIG. 4C over time.

However, as shown in FIG. 4C, when an obstacle or an extrusion 408 pushes the membrane 220 away from the inner wall of the pipe 202 (e.g., the membrane 220 forming an angle with the inner wall of the pipe 202, the angle being anywhere approximately in the range of about 5 degrees to about 90 degrees), the membrane 220 and the sensing element 210 may be pushed into contact with the bottom of the rigid slot structure 300. With the membrane and the sensing element in contact with the bottom of the rigid slot structure, there may be two opposing friction forces on the membrane 220. The first friction force is from inner wall of the pipe 202 and the obstacle 408. Similar to the friction force due to a fluid leak in FIG. 4A, the first friction force may stretch the membrane 220 temporarily before the membrane 220 moves to the right with the entire system 200 and passes the obstacle 408. Thus, the first friction force pulls to the left (e.g., as in FIG. 4C), opposite to the axial direction of the fluid flow and the motion of the entire system 200. The second friction force is from the slot 300. As the obstacle 408 pushes the membrane 220 and sensing element 210 into contact with the bottom of the rigid slot structure 300, there is a significant second friction force of the slot 300 on the membrane 220 and sensing element 210 particularly at their contact region with the slot edge 301. This additional, second friction force, which is not present in the case of a fluid leak pulling on the membrane, opposes the first friction force and prevents the membrane 220 and sensing element 210 from stretching. Therefore, the second friction force of the slot 300 constrains the stretch or strain of the membrane 220 and the sensing element 210, and reduces the combined natural frequency of the membrane 220 and the sensing element 210 in response to a stretch in the axial direction of the fluid flow. Thus, by artificially dampening the membrane's response when the membrane 220 is being pulled at an angle, the system's response to obstacles is slower than the system's response to leaks. For example, as shown in the graph 410 of FIG. 4D, the transient response 412 generated by the sensing element 210 in response to the quick pull and then release on the membrane 220 at an angle (e.g., the membrane 220 is shown at an approximately 10 degree angle from the pipe wall 202 while being pulled) may have a dominant frequency (e.g., less than about 10 Hz) that is significantly lower than the combined natural frequency (e.g., about 25 Hz) of the membrane 220 and the sensing element 210 in response to a stretch in the axial direction of the fluid flow. This dominant frequency is measured on the rising edge, the falling edge, or a combination of both of the transient response generated by the sensing element 210.

Accordingly, by using the rigid slot structure 300 as a mechanism for artificially dampening, a processor (not shown, but see FIG. 5 and related description) coupled to the sensing element 210 may be configured to discriminate between a fluid leak and an obstacle or extrusion on the inner wall of the pipe based on the dominant frequency of the transient output generated by the sensing element 210. For example, if the dominant frequency of the transient output is less than the predetermined, combined natural frequency of the membrane 220 and the sensing element 210 in response to a stretch in the axial direction of the fluid flow, the processor may detect or infer that the sensing element 210 detected an obstacle or an extrusion and not a leak. Conversely, if the dominant frequency of the transient output generated by the sensing element 210 is equal to or greater the predetermined, combined natural frequency of the membrane 220 and the sensing element 210 in response to a stretch in the axial direction of the fluid flow, the processor may detect or infer that the sensing element 210 detected a fluid leak. Although the membrane 220 may contact the top of the rigid slot structure 300 when drawn into contact with the wall at a fluid leak 402, the amount of dampening that may result would be significantly less than the artificial dampening caused by an obstacle or extrusions pushing the membrane down onto the bottom of the slot 300. In some embodiments, the processor may use two (or any other reasonable number, as would be understood by those skilled in the art) bandpass filters to distinguish between an artificially damped signal associated with an obstacle and a higher frequency signal associated with a fluid leak.

Figure 5:
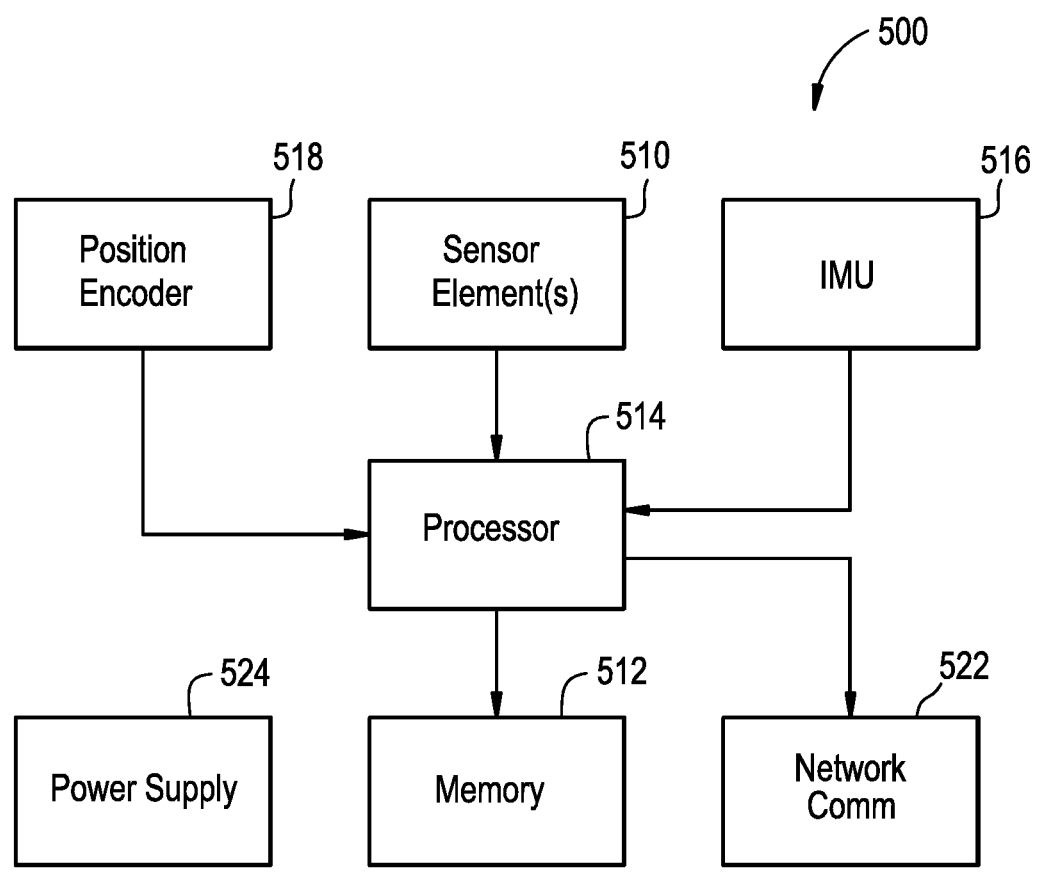
FIG. 5 is a schematic diagram illustrating one exemplary embodiment of components of a computing device that may be operated in conjunction with an in-pipe leak detection system and that may be configured to detect fluid leaks and/or to discriminate between fluid leaks and false fluid leaks.

FIG. 5 is a schematic diagram illustrating one exemplary embodiment of components of a computing device 500 that may be operated in conjunction with an in-pipe leak detection system (e.g., 200) and that may be configured to detect fluid leaks and/or to discriminate between fluid leaks and false fluid leaks. The computing device 500 may include various circuits and other electronic components used to power and control the operation of the computing device 500. The computing device 500 may include a processor 514, memory 512, sensing elements 510, an inertial measurement unit (IMU) or IMUs 516, a position encoder or position encoders 518, a network communications processor 522, and a power supply 524.

In some embodiments, the processor 514 may be any programmable microprocessor, microcomputer, microcontroller, or multiple processor chip or chips that can be configured by software instructions (e.g., applications) to perform a variety of functions, including detecting a fluid leak from a transient output signal of one or more of the sensing elements 510 and distinguishing between a fluid leak from a false fluid leak based on the outputs of one or more of the sensing elements 510, the IMU 516, a position encoder 518, or any combination thereof. The software instructions and/or software applications may be stored in the memory 512 before they are accessed and loaded into the processor 514. The processor 514 may additionally or alternatively include internal memory sufficient to store such software instructions and/or applications.

The memory 512 may store processor-executable instructions. The memory 512 may also store data measured by processor 514 from sensing elements 510, IMU(s) 516 or position encoder(s) 518, or any combination of them. The memory 512 may be volatile memory (e.g., random access memory or RAM), non-volatile memory (e.g., flash memory), or a combination thereof. The memory 512 may include internal memory included in the processor 514, memory external to the processor 514, or any combination thereof. In some embodiments, the processor may store the output data from one or more of the sensing elements 510, the IMU(s) 516, the position encoder(s) 518, or any combination thereof in the memory 512 for subsequent access by a remote computing device (not shown) (e.g., computer, mobile device, etc.) configured to detect fluid leaks and/or to discriminate between fluid leaks and false fluid leaks based on such output in a post-processing operation.

The processor 514 may be coupled to a network communications processor 522 to communicate the detection of a fluid leak and/or other data associated with the detection or non-detection of a fluid leak in a pipe to a remote computing device (not shown). For example, in some embodiments, the processor 514 may perform operations for detecting a fluid leak from a transient output signal of one or more of the sensing elements 510 and distinguishing between a fluid leak from a false fluid leak based on the outputs of one or more of the sensing elements 510, the IMU(s) 516, the position encoder(s) 518, or any combination thereof. In some embodiments, the processor may communicate the output data from one or more of the sensing elements 510, the IMU(s) 516, the position encoder(s) 518, or any combination thereof via the network communications processor 522 to a remote computing device (not shown) configured to detect fluid leaks and/or to discriminate between fluid leaks and false fluid leaks based on such output in a post-processing operation. For example, in some embodiments, the network communications processor 522 may be a radio frequency (RF) processor configured to wirelessly receive and transmit signals via an antenna from and/or to a remote computing device. The network communication processor 522 may be a transmit-only or a two-way transceiver processor. For example, the network communications processor 522 may include a single transceiver chip or a combination of multiple transceiver chips for transmitting and/or receiving signals. The network communications processor 522 may operate in one or more of a number of radio frequency bands depending on the supported type of communications. The network communications processor 522 may be configured to operate all the time, at predetermined schedules, at predetermined locations, or any combination thereof.

The processor 514, the memory 512, the sensing elements 510, the at least one IMU 516, the at least one position encoder 518, and the network communications processor 522, and any other electronic components of the computing device 500 may be powered by the power supply 524. In some embodiments, the power supply 524 may be a battery, a solar cell, or other type of energy harvesting power supply. A person skilled in the art, in view of the present disclosures, will understand how to implement the computing device 500, or at least various components thereof, into the various systems (e.g., the system 200) provided for herein without departing from the spirit of the present disclosure.

FIG. 6 illustrates one exemplary embodiment of a method 600 of detecting a fluid leak in a pipe and discriminate between fluid leaks and false fluid leaks. With reference to FIGS. 1-6, operations of the method 600 may be performed by a computing device of an in-pipe leak detection system (e.g., 500), and particularly a processor (e.g., 514) within the computing device.

In block 610, the processor may receive a transient output signal from a sensing element (e.g., 210) that is coupled to a membrane (e.g., 220) of an in-pipe leak detection system (e.g., 200). The sensing element and the membrane may be coupled and disposed substantially parallel to or in-line with an axial direction of a fluid flow in the pipe. For example, the transient output signal from the sensing element may be a transient voltage signal that represents a change in an electrical impedance of the sensing element.

In block 620, the processor may determine if the received transient output signal is indicative of a pulling force (e.g., stretch) or a strain (e.g., displacement or deformation) on the membrane 220 that exceeds a respective threshold pulling force or a threshold strain. The threshold pulling force or the threshold strain may be a magnitude, a frequency threshold, or a combination of both. In some embodiments, determining if the received transient output signal is indicative of a pulling force or a strain on the membrane that exceeds the respective threshold pulling force or threshold strain may include converting the transient voltage signal into a transient signal that represents a pulling force or a strain on the membrane based on a predetermined relationship between impedance and pulling force or strain for the sensing element. Once converted, the processor may determine whether the transient signal that represents the pulling force or the strain on the membrane includes a magnitude and/or a dominant frequency that exceeds the respective threshold pulling force or the threshold strain.

In block 630, if the received transient output signal is determined to be indicative of a pulling force or a strain on the membrane that exceeds a respective threshold pulling force or threshold strain, the processor may indicate a presence of a fluid leak in the pipe. In some embodiments, if the magnitude and/or dominant frequency determined in block 620 exceeds the respective threshold pulling force or threshold strain, the processor may indicate a presence of a fluid leak in the pipe. For example, the processor may indicate the presence of a fluid leak by wirelessly sending an alarm or warning message to a remote computing device over a network communications processor (e.g., 522). The processor may also record the presence of the fluid leak by recording an alarm or warning to memory (e.g., 512) of the computing device (e.g., 500), including but not limited to a memory card. The magnitude of the fluid leak estimated and ranked based on the magnitude and duration of pulling force or strain, may also be wirelessly sent or recorded. The processor may also wirelessly transmit or record in memory (e.g., 512) all or part of the measured data from the leak detection system (e.g., system 200).

FIG. 7 illustrates another exemplary embodiment of a method 700 of detecting a fluid leak in a pipe and discriminating between fluid leaks and false fluid leaks. With reference to FIGS. 1-7, operations of the method 700 may be performed by a computing device of an in-pipe leak detection system (e.g., 500), and particularly a processor (e.g., 514) within the computing device. The method 700 may include operations described in blocks 610 and 620 of FIG. 6.

In block 610, the processor may receive a transient output signal from a sensing element (e.g., 210) that is coupled to a membrane (e.g., 220) of an in-pipe leak detection system (e.g., 200). The sensing element and the membrane may be coupled and disposed substantially parallel to or in-line with an axial direction of a fluid flow in the pipe.

In block 620, the processor may determine if the received transient output signal is indicative of a pulling force (e.g., stretch) or a strain (e.g., displacement or deformation) on the membrane 220 that exceeds a respective threshold pulling force or a threshold strain. The threshold pulling force or the threshold strain may be a magnitude, a frequency threshold or a combination of both.

In block 710, the processor may receive an output signal from one or more of an inertial measurement unit (IMU) (e.g., 516), one or more of a position encoder (e.g., 518), or any combination thereof. For example, the position encoder may output a signal in response to a detected change in the position, such as an angular deviation, of at least one of the radially extending support arms (e.g., 232) of a support structure (e.g., 230). An IMU may output a signal in response to a detected change in the rotational speed of the in-pipe leak detection system (e.g., 200). For example, the IMU may output a signal that indicates when the system (e.g., 200) changes direction, such as turning through an elbow of a pipe system.

In block 720, the processor may determine if an indication of a fluid leak in the pipe determined in block 620 is false based on the output signal from the IMU (e.g., 516), the position encoder (e.g., 518), or both. For example, with the pressure of the fluid flow maintaining the support arms (e.g., 232) of the support structure (e.g., 230) into an expanded state against the inner wall of the pipe, it may be less likely that a fluid leak would cause a positional change in the arms of the support structure. Rather, a position encoder would more likely trigger a positional change alert in response to an obstacle or other extrusion on the pipe wall pushing, such that one or more of the radially extending support arms is compressed. Similarly, when an IMU outputs a signal in response to a change in the rotational speed of the in-pipe leak detection system (e.g., 200), it is likely that any stretch or strain on the membrane (e.g., 220) would be due to the transport of the system through the pipe elbow as opposed to a fluid leak.

In block 730, the processor may indicate a presence of a fluid leak in the pipe or otherwise prevent such indication of the presence of a fluid leak based on the determination in block 720. For example, if the output signal from the IMU (e.g., 516) or the position encoder (e.g., 518) renders the initial detection of a fluid leak (e.g., in block 620) false, the processor may prevent the indication of a presence of a fluid leak. Otherwise, the processor may proceed to issue an indication of a fluid leak in the pipe. For example, the processor may indicate the presence of a fluid leak by wirelessly sending an alarm or warning message to a remote computing device over a network communications processor (e.g., 522). The processor may also record the presence of the fluid leak by recording an alarm or warning to memory (e.g., 512) of the computing device (e.g., 500), including but not limited to a memory card. The magnitude of the fluid leak estimated and ranked based on the magnitude and duration of pulling force or strain, may also be wirelessly sent or recorded. The processor may also wirelessly transmit or record in memory (e.g., 512) all or part of the measured data from the leak detection system (e.g., system 200), the IMU(s), and the position encoder(s).

FIG. 8 illustrates another exemplary embodiment of a method 800 of detecting a fluid leak in a pipe and discriminating between fluid leaks and false fluid leaks. With reference to FIGS. 1-8, operations of the method 800 may be performed by a computing device of an in-pipe leak detection system (e.g., 500), and particularly a processor (e.g., 514) within the computing device.

In block 810, the processor may receive multiple transient output signals from multiple sensing elements (e.g., 210) respectively coupled to multiple membranes (e.g., 220) of the in-pipe leak detection system (e.g., 200). Multiple membranes (e.g., 4 or more) may be used to cover the entire circumference of a pipe cross section for leak detection, such that each membrane faces a different side, quadrant, or other section of the inner wall of the pipe. The sensing elements and the membranes may be coupled and disposed substantially parallel to or in-line with the axial direction of the fluid flow in the pipe (e.g., 202). For example, each of the transient output signals from the sensing elements may be a transient voltage signal that represents a change in an electrical impedance of a respective sensing element.

In block 820, the processor may determine if one or more of the received transient output signals is indicative of a pulling force or a strain on one or more of the membranes (e.g., 220) that exceeds the respective threshold pulling force or threshold strain. The threshold pulling force or the threshold strain may be a magnitude, a frequency threshold, or a combination of both. In some embodiments, determining if one or more of the received transient output signals is indicative of a pulling force or a strain on the membrane that exceeds the respective threshold pulling force or threshold strain may include converting the multiple transient voltage signals into multiple transient signals that represent pulling forces or strains on of the membranes based on a predetermined relationship between impedance and pulling force or strain for the sensing elements. Once converted, the processor may determine whether one or more of the converted transient signals include a magnitude and/or a dominant frequency that exceeds a threshold pulling force or threshold strain.

In block 830, if the only one of the received transient output signals is determined to exceed a respective threshold pulling force or threshold strain, the processor may indicate a presence of a fluid leak in the pipe. Conversely, if more than one of received transient output signals is determined to exceed a respective threshold pulling force or threshold strain, the processor may prevent an indication of a fluid leak in the pipe and return processing to block 810.

FIGS. 9A through 9F are graphs illustrating examples in which output signals from multiple sensing elements (e.g., 210 or 510) and an inertial measurement unit (e.g., IMU 516) may be used to discriminating between fluid leaks and/or for discriminating fluid leaks from false detections.

Figure 9A:
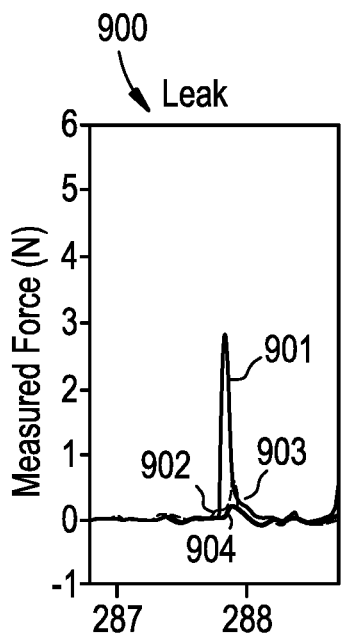
FIG. 9A is a graph illustrating one example of measured forces by multiple sensing elements of an in-pipe leak detection system in accordance with the present disclosures over time when the leak detection system passes a leak existing in a pipe.

FIG. 9A is a graph 900 illustrating one example of measured forces obtained by four sensing elements (e.g., 210 or 510) of an in-pipe leak detection system (e.g., 200) over time. FIG. 9B is a graph 910 illustrating one example of a rotational speed of the in-pipe leak detection system detected by an IMU over the same time period of the graph 900 in FIG. 9A. Referring to the graph 900, each of the concurrent transient output signals 901, 902, 903, and 904 may represent the measured forces applied to a membrane corresponding to one quadrant of a pipe circumference. As shown, the transient output signal 901 includes a significant, high dominant, frequency (fast) peak in measured force, while the other signals 902, 903, and 904 do not. Referring to FIG. 9B, the rotational speed of the in-pipe leak detection system (e.g., 200) detected by the IMU (e.g., 516) is relatively constant. Because only one of the signals includes a transient response that may be indicative of a fluid leak and there is no significant change in the rotational speed of the system, it is likely that the measured peak in the transient output signal 901 is due to a fluid leak as opposed to an obstacle in the pipe. Thus, the processor (e.g., 514) can output an indication of the presence of a detected fluid leak.

Figure 9C:
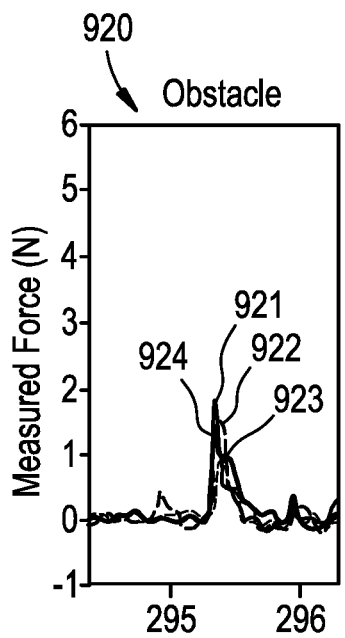
FIG. 9C is a graph illustrating one example of measured forces by multiple sensing elements of an in-pipe leak detection system in accordance with the present disclosures over time when the leak detection system passes an obstacle existing in a pipe and a leak is not present in a vicinity of the obstacle.

FIG. 9C is a graph 920 illustrating one example of measured forces obtained by four sensing elements (e.g., 210 or 510) of an in-pipe leak detection system (e.g., 200) over time. FIG. 9D is a graph 930 illustrating one example of a rotational speed of the in-pipe leak detection system detected by an IMU (e.g., 516) over the same time period of the graph 920 in FIG. 9C. Referring to the graph 920, each of the concurrent transient output signals 921, 922, 923, and 924 may represent the measured forces applied to a membrane corresponding to one quadrant of a pipe circumference. As shown, each of the transient output signals 921, 922, 923, and 924 includes a significant but low dominant frequency (slower) peak. Referring to FIG. 9D, the rotational speed of the in-pipe leak detection system (e.g., 200) detected by the IMU (e.g., 516) is relatively constant as indicated by the output signal 931. Because more than one of the transient output signals includes a significant peak in measured force but their peaks are of low dominant frequency (slower), it is more likely that the increase in measured forces at that location may be due to a circumferential obstacle in the pipe (e.g., a reduction in pipe diameter) as opposed to a circumferential fluid leak. Thus, the processor (e.g., 514) can prevent any output indicating the presence of a fluid leak. The output of the IMU in 931 does not change the decision that no leak is detected.

Figure 9E:
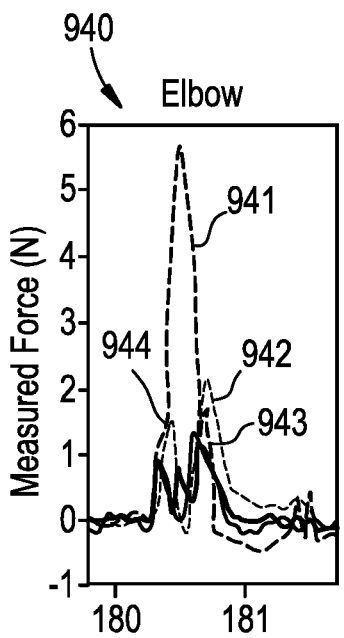
FIG. 9E is a graph illustrating one example of measured forces by multiple sensing elements of an in-pipe leak detection system in accordance with the present disclosures over time when the leak detection system passes a pipe elbow existing in a pipe and a leak is not present in a vicinity of the elbow.
Figure 9B:
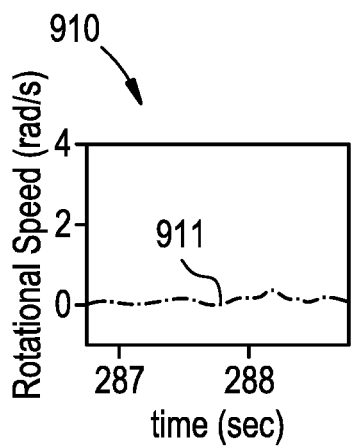
FIG. 9B is a graph illustrating a rotational speed measured by an inertial measurement unit (IMU) of the in-pipe leak detection system of FIG. 9A over time when the leak detection system passes a leak existing in a pipe.
Figure 9D:
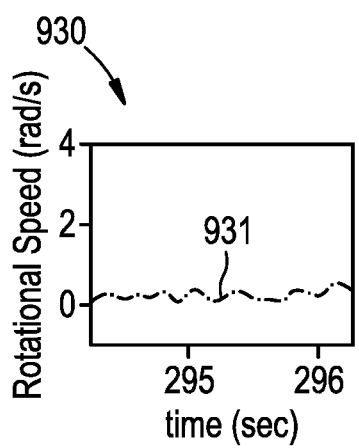
FIG. 9D is a graph illustrating a rotational speed measured by an IMU of the in-pipe leak detection system of FIG. 9C over time when the leak detection system passes the obstacle existing in the pipe and a leak is not present in the vicinity of the obstacle.
Figure 9F:
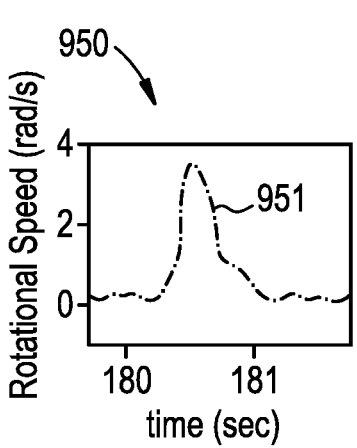
FIG. 9F is a graph illustrating a rotational speed measured by an IMU of the in-pipe leak detection system of FIG. 9E over time when the leak detection system passes the pip elbow existing in the pipe and a leak is not present in the vicinity of the elbow.

FIG. 9E is a graph 940 illustrating one example of measured forces obtained by four sensing elements (e.g., 210 or 510) of an in-pipe leak detection system (e.g., 200) over time. FIG. 9F is a graph 950 illustrating one example of a rotational speed of the in-pipe leak detection system detected by an IMU (e.g., 516) over the same time period of the graph 940 in FIG. 9E. Referring to the graph 940, each of the concurrent transient output signals 941, 942, 943, and 944 may represent the measured forces applied to a membrane corresponding to one quadrant of a pipe circumference. As shown, the transient output signal 941 includes a significant peak that may be indicative of a fluid leak. The other transient output signals 942, 943, and 944 also include multiple peaks, albeit less than the peak of the signal 941. However, referring to FIG. 9F, there is a significant change in the rotational speed of the in-pipe leak detection system (e.g., 200) detected by the IMU (e.g., 516) at approximately the same location as the peaks detected in the forces measured in the transient output signals shown in FIG. 9E. The significant change in the rotational speed of the system indicates that the location is at a pipe elbow. It is more likely that the increase in measured forces is due to the flow bending the membranes as the system 200 and the fluid flow turn around the pipe elbow, rather than a leak. Thus, the processor (e.g., 514) can prevent any output indicating the presence of a detected fluid leak due to the detection of the change in rotational speed of the system as detected by the IMU (e.g., 516).

Figure 10A:
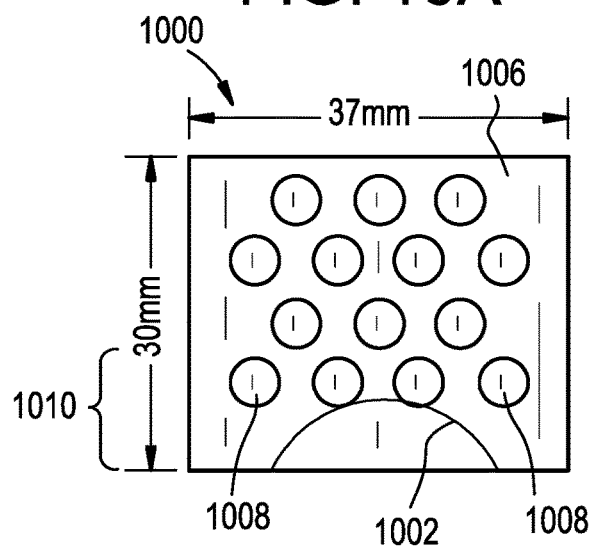
FIG. 10A illustrates one exemplary embodiment of a membrane of an in-pipe leak detection system, the membrane having one or more embedded sensing elements.
Figure 10B:
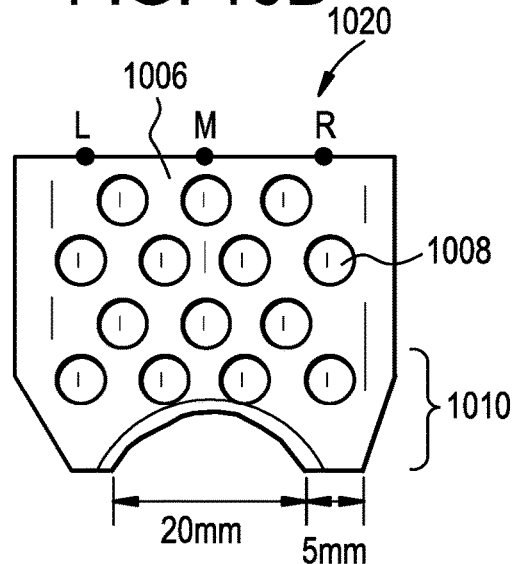
FIG. 10B illustrates the membrane of FIG. 10A having a portion thereof removed.

FIGS. 10A and 10B illustrate membranes having embedded sensing elements for use in in-pipe leak detection system (e.g., 200). For example, FIG. 10A illustrates one exemplary embodiment of a membrane of an in-pipe leak detection system having one or more embedded sensing elements. As shown, the side of membrane 1000 facing the inner wall of the pipe may have a substantially rectangular shape. A sensing element 1002 may be embedded in the membrane 1000. The sensing element 1002 may be a conductive cord having a variable electrical impedance that is correlated to the stretch or strain on the membrane. For example, the conductive cord may be made of a conductive rubber. A person skilled in the art, in view of the present disclosures, will understand how various material with stretch-strain dependent electrical impedance properties can be used in conjunction with the systems and devices provided for herein, and thus reference to a conductive cord is by no means limiting. Many other materials and devices, including but not limited to strain gauges, liquid alloy, conductive fluid, and conductive or capacitive fabrics, polymer and composite material as sensing element 1002 be utilized by a person skilled in the art.

The membrane 1000 may have a thin cross-sectional area substantially perpendicular to an axial direction of the fluid flow in order to facilitate stretching in response to a friction force when a fluid leak draws the membrane into contact with the inner wall of the pipe. In some embodiments, the membrane 1000 may have a cross-sectional thickness configured to maximize a natural frequency of the membrane's stretch motion in the axial direction of the fluid flow. For example, in some embodiments, the cross-sectional thickness of the membrane 1000 may be approximately in the range of about 0.5 mm to about 10 mm, and in some embodiments it can be about 2 mm. The surface 1006 of the membrane facing the inner wall may have a large cross-sectional area configured to minimize a natural frequency of motion associated with the membrane in a direction substantially perpendicular to the axial direction of the fluid flow. In some embodiments, the membrane 1000 may have a dimpled surface comprising one or more dimples or cavities 1008 formed in the surface of the membrane to increase the lower bound of the friction between the membrane 1000 and the inner wall of a pipe when there is a suction force between the membrane 1000 and the inner wall of the pipe. The surface of membrane 1006 that faces the inner wall of the pipe may be textured to prevent an extremely strong suction force between the membrane 1000 and the inner wall of the pipe in a pressurized fluid environment, and thus decrease the upper bound of the friction between the membrane 1000 and the inner wall of the pipe.

To increase a sensitivity of the sensing element 1002, the region of the membrane 1010 containing the embedded sensing element may be configured to have a lower stiffness characteristic or property than the remainder of the membrane. For example, in some embodiments, the region of the membrane 1010 containing the embedded sensing element 1002 may be made of a first rubber material and the remainder of the membrane is made of a second rubber material, such that the stiffness characteristic or property of the first rubber material is lower than the stiffness characteristic or property of the second rubber material. A person skilled in the art, in view of the present disclosures, will understand how the stiffness characteristics or properties of various materials can be used to form membranes that can be used in conjunction with the systems and devices provided for herein, and thus reference to a rubber materials is by no means limiting. Many other materials including but not limited to fabrics, polymer and composite material for the membrane 1020, membrane 1010 can be utilized by a person skilled in the art.

FIG. 10B illustrates a membrane 1020 that is similar to the membrane 1000 of FIG. 10A. However, the geometry of the membrane 1020 is modified to increase the sensitivity of the sensing element 1002 embedded therein. For example, as shown, a portion of the membrane around the sensing element 1002 may be removed, such that the region of the membrane 1010 containing the embedded sensing element 1002 conforms to the shape of the embedded sensing element while has substantially less cross-sectional area perpendicular to the axial direction of the flow.

Figure 11:
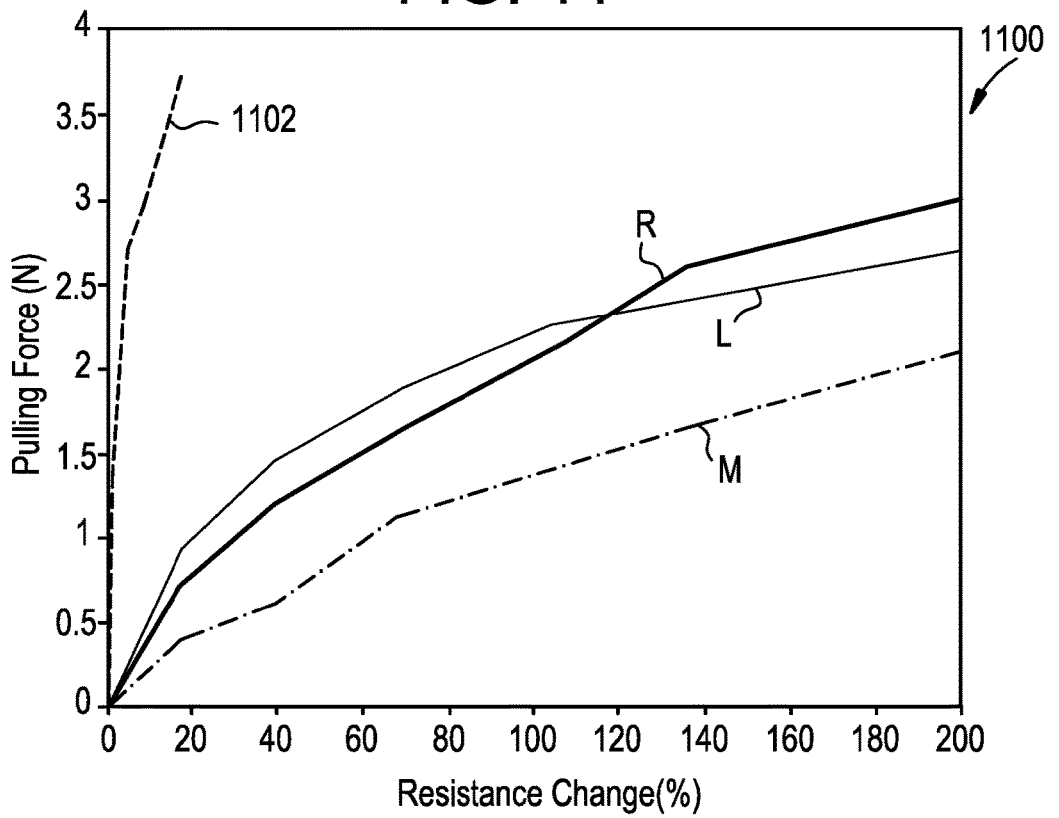
FIG. 11 is a graph illustrating a comparison of a sensitivity associated with different geometries of the membranes of FIGS. 10A and 10B.

FIG. 11 is a graph 1100 illustrating a comparison of a sensitivity associated with different geometries of the membranes of FIGS. 10A and 10B. As shown, the sensitivity of the embedded sensing element 1002 may be represented as a relationship between a percentage change of pulling force to a percentage change of resistance. Thus, by reducing the cross-sectional area perpendicular to the axial direction of the flow in the region of the membrane 1010 that containing the embedded sensing element 1002, the sensitivities at R (right point), L (left point), M (mid-point) of the membrane 1020 may be configured to be greater than the sensitivity 1102 of the membrane 1000. However, the sensitivity of the membrane 1020 having the cutaway geometry can vary across the surface width. For example, as shown in FIG. 11, the sensing element 1002 is more sensitive to stretching force applied along the middle line M of the membrane as opposed to the far sides of the membrane L and R.

Figure 12:
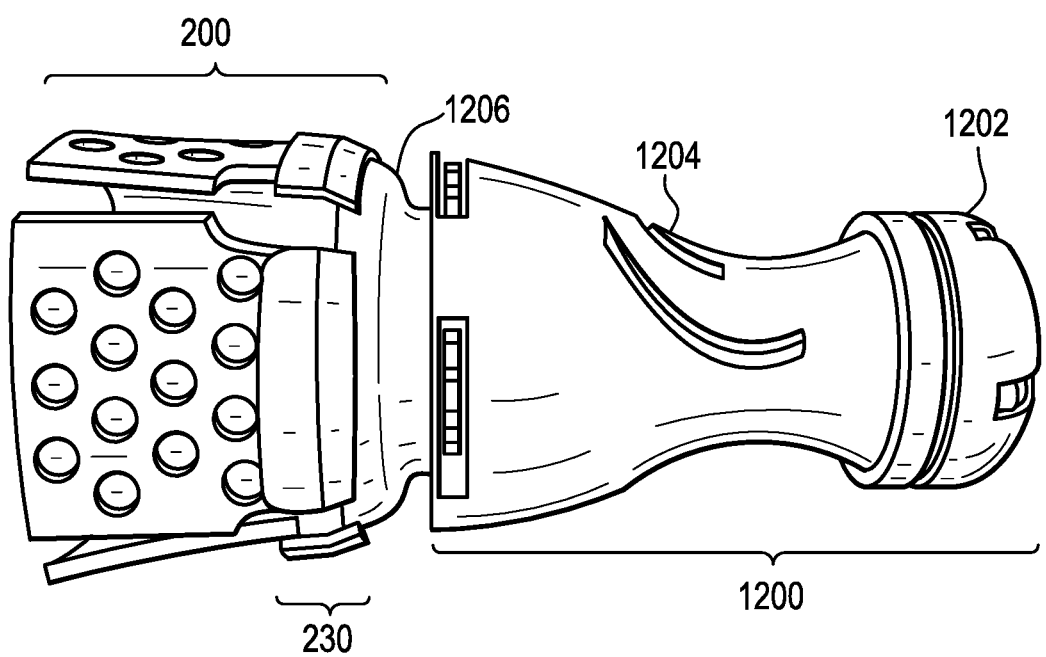
FIG. 12 illustrates one exemplary embodiment of the in-pipe leak detection system of FIG. 2 coupled to a flow-driven robot, the system including four of the membranes having one or more embedded sensing elements of FIG. 10B.

FIG. 12 illustrates one exemplary embodiment of the in-pipe leak detection system 200 of FIG. 2 coupled to a flow-driven robot or drone 1200. For example, the flow driven robot 1200 may include a pipeline inspection gauge (PIG) for transporting the leak detection system 200 through a pipeline. With a flow-driven robot, the system 200 may be transported through the pipeline at the speed of the flow. For example, in some embodiments, the speed of the fluid flow may be approximately 0.1 m/s and greater. As shown, the flow-driven robot 1200 may include a cap 1202 and a soft body portion 1204 made of rubber. The soft body portion 1204 may facilitate, for example, the ability of the robot to turn through elbows in the pipeline without getting stuck. In some embodiments, the soft body of the flow-driven robot 1200 may be configured to house one of more of a processor (e.g., 514), memory (e.g., 512), a position encoder (e.g., 518), an IMU (e.g., 516), a network communications processor (e.g., 522), and a power supply (e.g., 524). The flow-driven robot 1200 may be coupled to a base portion 1206 of the support structure 230, such that the wires or other leads from the multiple sensing elements 210 may be coupled to the processor.

Figure 13A:
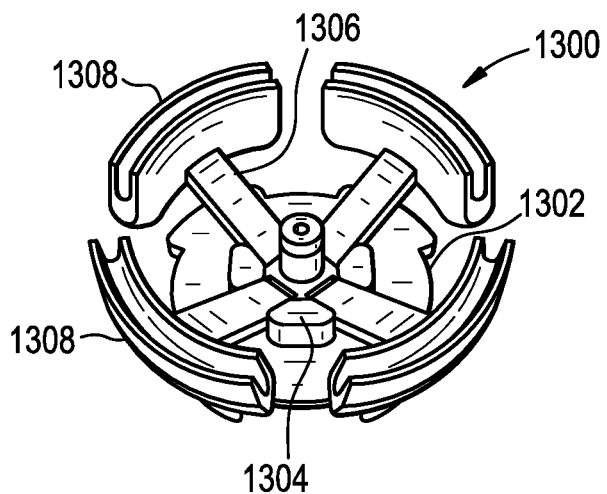
FIG. 13A illustrates one exemplary embodiment of a support structure for the in-pipe leak detection system of FIG. 12, the support structure having four radially extending support arms configured to receive membranes and/or sensing elements provided for in the present disclosure, such as the membrane having one or more embedded sensing elements provided for in FIGS. 10A and 10B.

FIG. 13A illustrates one exemplary embodiment of the support structure 1300 for the in-pipe leak detection systems of the present disclosure (e.g., FIGS. 2, 12). As shown, the support structure 1300 includes a base 1302, a hub 1304, four radially extending support arms 1306, and four rigid slot structures 1308. In the illustrated embodiment, the base 1302 has a substantially circular shape, although many other shapes are possible. The hub 1304 may be centrally disposed on the inner face of the base 1302. The four support arms 1306 may be coupled to the common hub 1304 and extend radially away from the hub 1304. Each of the radially extending support arms 1306 may be coupled at a terminal end to one of the four rigid support structures 1308. The arms 1306 can be used to attach respective sensing elements and/or membranes to the support structure 1300. Each of the four rigid slot structures 1308 extend substantially perpendicular to the base 1302 so that the membranes (not shown) may be positioned substantially parallel to or in-align with an axial direction of the fluid flow. Each of the rigid slot structures 1308 may have an arcuate shape so that the rigid slot structures may form a circular array for conforming and/or adapting to the circumference of an inner wall of a pipe. Although four support arms 1306 and slot structures 1308 are shown, more or less may be used depending, at least in part, on the number of membranes being used for detecting fluid leaks, among other factors.

Figure 13B:
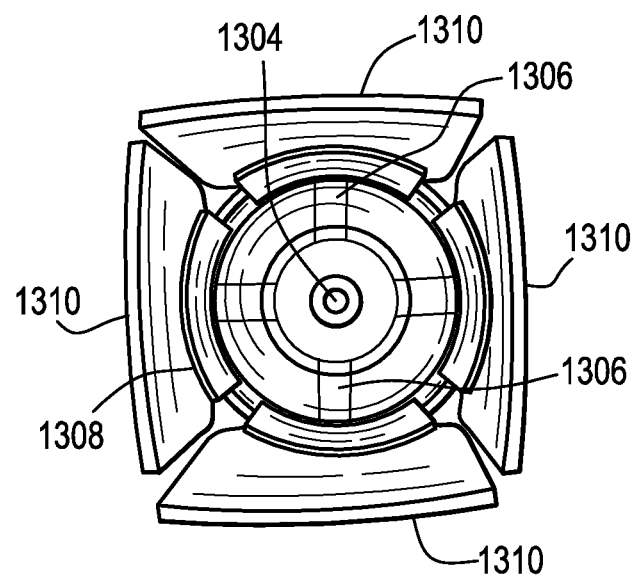
FIG. 13B illustrates one exemplary embodiment of the support structure of FIG. 13A having four of the membranes having one or more embedded sensing elements of FIG. 10B coupled thereto to form the coupling mechanism of FIG. 3.

FIG. 13B illustrates one exemplary embodiment of the support structure of FIG. 13A attached to four membranes shown in FIGS. 10A and 10B. As shown, each of the four membranes 1310 is disposed in a respective one of the rigid slot structures 1308. The four membranes 1310 extend substantially perpendicular relative to the base 1302 such that the leak detecting surface of the membranes 1310 (as shown in FIG. 10B) may face the inner wall. FIG. 13B shows four membranes 1310 being used to substantially cover the entire circumference of a pipe such that the membranes may detect leaks in each of the four quadrants of a pipe circumference. However, more than four membranes, or membranes of different sizes and configurations, can be used to divide the pipe circumference into more or less than four quadrants, thereby enabling the system to more precisely locate the radial position of a leak within a pipe circumference. Further, in some embodiments, additional membranes can be layered on either or both sides of the membrane faces or behind the membranes in the axial direction of the fluid flow to help close any openings formed between adjacent membranes.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

The invention claimed is:

1. An in-pipe leak detection system, comprising:
a membrane;
a sensing element coupled to the membrane, wherein the sensing element and the membrane are configured to be disposed substantially parallel to or in-line with an axial direction of a fluid flow in a pipe to identify a possible in-pipe leak;
a support structure coupled to at least one of the sensing element and the membrane and configured to position the membrane adjacent to an inner wall of a pipe in which a search for an in-pipe leak is being performed;
a mechanism coupling the membrane, and thereby the sensing element, to the support structure,
wherein the membrane is configured to be drawn into contact with the inner wall in response to a suction force caused by a fluid leak in the pipe,
wherein the mechanism is configured to artificially dampen a natural frequency of the membrane and the sensing element in response to a stretch in the axial direction of the fluid flow when an obstacle or an extrusion on the inner wall of the pipe pushes the membrane away from the inner wall of the pipe, and
wherein the fluid leak is detected based on a transient output from the sensing element that is indicative of a pulling force or strain on the membrane.

2. An in-pipe leak detection system, comprising:
a membrane;
a sensing element coupled to the membrane, wherein the sensing element and the membrane are configured to be disposed substantially parallel to or in-line with an axial direction of a fluid flow in a pipe to identify a possible in-pipe leak;
a processor coupled to the sensing element and
a support structure coupled to at least one of the sensing element and the membrane and configured to position the membrane adjacent to an inner wall of a pipe in which a search for an in-pipe leak is being performed,
wherein the membrane is configured to be drawn into contact with the inner wall in response to a suction force caused by a fluid leak in the pipe,
wherein the fluid leak is detected based on a transient output from the sensing element that is indicative of a pulling force or strain on the membrane, and
wherein the processor is configured to detect an obstacle or extrusion on the inner wall of the pipe in response to a dominant frequency of the transient output of the sensing element being less than the natural frequency of the membrane and the sensing element in response to the stretch in the axial direction of the fluid flow.

3. The system of claim 2, wherein the processor is further configured to detect a fluid leak in response to the dominant frequency of the transient output of the sensing element being equal to or greater than the natural frequency of the membrane and the sensing element in response to the stretch in the axial direction of the fluid flow.

4. The system of claim 1, wherein the support structure comprises at least one radially extending support arm having an end coupled to a slot, an outer wall of the end of the support arm being configured to be in contact with the inner wall of the pipe and maintain the membrane placed inside the slot, and thereby the sensing element, at a substantially fixed distance away from the inner wall of the pipe.

5. The system of claim 1, wherein the mechanism comprises:
a slot coupling the membrane to the support structure, the slot being configured to artificially dampen the natural frequency of the membrane and the sensing element in response to the stretch in the axial direction of the fluid flow when an obstacle or an extrusion on the inner wall of the pipe pushes the membrane into contact with a bottom of the slot.

6. An in-pipe leak detection system, comprising:
a plurality of membranes;
a plurality of sensing elements, the plurality of sensing elements being respectively coupled to the plurality of membranes, the plurality of sensing elements and the plurality of membranes being configured to be disposed substantially parallel to or in-line with the axial direction of the fluid flow in the pipe to identify a possible in-pipe leak;
at least one processor coupled to the plurality of sensing elements; and
a support structure including a plurality of radially extending support arms respectively coupled to at least one of the plurality of sensing elements and the plurality of membranes, the support structure being configured to position the plurality of membranes adjacent to an inner wall of a pipe in which a search for an in-pipe leak is being performed, wherein respective ends of the plurality of radially extending support arms are configured to expand to be in contact with the inner wall of the pipe in response to pressure from the fluid flow,
wherein the plurality of membranes are configured to be drawn into contact with the inner wall in response to a suction force caused by a fluid leak in the pipe,
wherein the fluid leak is detected based on a transient output from the sensing element that is indicative of a pulling force or strain on the membrane, and
wherein the at least one processor is configured to discriminate between a fluid leak and a false leak detection based on a comparison of a plurality of concurrent transient outputs from the plurality of sensing elements.

7. The system of claim 6, wherein the plurality of radially extending support arms are respectively coupled to at least one of the plurality of sensing elements and the plurality of membranes such that the plurality of membranes substantially cover a circumference of the inner wall of the pipe.

8. The system of claim 6, wherein the at least one processor is configured to detect a false fluid leak in response to more than one of the plurality of concurrent transient outputs from the plurality of sensing elements being indicative of a pulling force or strain on the membrane.

9. The system of claim 6, wherein the at least one processor is configured to detect a fluid leak in response to one of the plurality of concurrent transient outputs from the plurality of sensing elements being indicative of a pulling force or strain on the membrane.

10. An in-pipe leak detection system, comprising:
a plurality of membranes;
a plurality of sensing elements, the plurality of sensing elements being respectively coupled to the plurality of membranes, the plurality of sensing elements and the plurality of membranes being configured to be disposed substantially parallel to or in-line with the axial direction of the fluid flow in the pipe to identify a possible in-pipe leak;
a support structure including a plurality of radially extending support arms respectively coupled to at least one of the plurality of sensing elements and the plurality of membranes, wherein respective ends of the plurality of radially extending support arms are configured to expand to be in contact with the inner wall of the pipe in response to pressure from the fluid flow;
at least one position encoder coupled to the plurality of radially extending support arms; and
a processor configured to detect a false fluid leak in response to the at least one position encoder outputting a signal indicating a change in a position of at least one of the plurality of radially extending support arms,
wherein the plurality of membranes are configured to be drawn into contact with the inner wall in response to a suction force caused by a fluid leak in the pipe, and
wherein the fluid leak is detected based on a transient output from the sensing element that is indicative of a pulling force or strain on the membrane.

11. An in-pipe leak detection system, comprising:
a plurality of membranes;
a plurality of sensing elements, the plurality of sensing elements being respectively coupled to the plurality of membranes, the plurality of sensing elements and the plurality of membranes being configured to be disposed substantially parallel to or in-line with the axial direction of the fluid flow in the pipe to identify a possible in-pipe leak;
a support structure including a plurality of radially extending support arms respectively coupled to at least one of the plurality of sensing elements and the plurality of membranes, wherein respective ends of the plurality of radially extending support arms are configured to expand to be in contact with the inner wall of the pipe in response to pressure from the fluid flow;
at least one inertial measurement unit; and
a processor coupled to the at least one inertial measurement unit and configured to detect a false fluid leak in response to the at least one inertial measurement unit outputting a signal indicating a change in a rotational speed of the system,
wherein the plurality of membranes are configured to be drawn into contact with the inner wall in response to a suction force caused by a fluid leak in the pipe, and
wherein the fluid leak is detected based on a transient output from the sensing element that is indicative of a pulling force or strain on the membrane.

12. The system of claim 2, wherein the sensing element is embedded in the membrane.

13. The system of claim 2, wherein the membrane and sensing element are configured to identify a possible in-pipe leak while fluid is actively flowing through the pipe.

14. The system of claim 2, wherein the membrane and sensing element are configured to identify a possible in-pipe leak while moving through the pipe.

15. The system of claim 2, further comprising:
a flow-driven robot coupled to the support structure.

16. A method of detecting a fluid leak in a pipe, comprising:
receiving a transient output signal from a sensing element that is coupled to a membrane of an in-pipe leak detection system disposed in a pipe, the sensing element and the membrane being coupled and being disposed substantially parallel to or in-line with an axial direction of a fluid flow in the pipe;
determining if the received transient output signal is indicative of a pulling force or a strain on the membrane that exceeds a respective threshold pulling force or threshold strain; and
if the received transient output signal is determined to be indicative of a pulling force or a strain on the membrane that exceeds a respective threshold pulling force or threshold strain, indicating a presence of a fluid leak in the pipe.

17. The method of claim 16,
wherein the transient output signal from the sensing element is a transient voltage signal that represents a change in an electrical impedance of the sensing element,
wherein determining if the received transient output signal is indicative of a pulling force or a strain on the membrane that exceeds the respective threshold pulling force or threshold strain comprises:
converting the transient voltage signal into a transient signal that represents a pulling force or a strain on the membrane based on a predetermined relationship between impedance and pulling force or strain for the sensing element; and
determining whether the transient signal that represents the pulling force or the strain on the membrane includes one or more of a magnitude and a dominant frequency that exceeds the respective threshold pulling force or the threshold strain, and
if the one or more of the magnitude and the dominant frequency exceeds the respective threshold pulling force or threshold strain, indicating a presence of a fluid leak in the pipe.

18. The method of claim 16, further comprising:
receiving an output signal from one or more of at least one position encoder or at least one inertial measurement unit coupled to the in-pipe leak detection system;
determining if an indication of a fluid leak in the pipe is false based on the output signal from one or more of the at least one position encoder or the at least one inertial measurement unit and if the indication of a fluid leak in a pipe is determined to be false, either indicating no presence of a fluid leak in the pipe or preventing an indication of a presence of a fluid leak in the pipe.

19. The method of claim 16, wherein the threshold pulling force or the threshold strain is one or more of a magnitude and a dominant frequency of the transient output signal.

20. The method of claim 16, further comprising:
receiving a plurality of transient output signals from a plurality of sensing elements respectively coupled to a plurality of membranes of the in-pipe leak detection system, the plurality of sensing elements and the plurality of membranes being coupled and being disposed substantially parallel to or in-line with the axial direction of the fluid flow in the pipe;
determining if one or more of the plurality of received transient output signals is indicative of a pulling force or a strain on one or more of the plurality of membranes that exceeds the respective threshold pulling force or threshold strain; and
if only one of the plurality of received transient output signals exceeds the respective threshold pulling force or threshold strain, indicating a presence of a fluid leak in the pipe.

21. The method of claim 20,
wherein each of the plurality of transient output signals from the plurality of sensing elements is a transient voltage signal that represents a change in an electrical impedance of a respective sensing element,
wherein determining if one or more of the plurality of received transient output signals is indicative of a pulling force or a strain on one or more of the plurality of membranes that exceeds the respective threshold pulling force or threshold strain comprises:
converting the plurality of transient voltage signals into a plurality of transient signals that represent pulling forces or strains on the plurality of membranes based on a predetermined relationship between impedance and pulling force or strain for the plurality of sensing elements; and
determining whether one or more of the plurality of transient signals that represent the pulling forces or the strains on the plurality of membranes includes one or more of a magnitude and a dominant frequency that exceed the respective threshold pulling force or threshold strain, and
if only one of the plurality of received transient output signals is determined to be indicative of a pulling force or a strain that exceeds the respective threshold pulling force or threshold strain, indicating a presence of a fluid leak in the pipe.

22. The method of claim 16,
wherein the sensing element measures one or more parameters to determine the transient output signal that is provided by the sensing element and is subsequently received,
wherein the fluid flow in the pipe is active when the one or more parameters are measured by the sensing element.

23. The method of claim 16, further comprising:
disposing a flow-driven robot in the pipe to move the in-pipe leak detection system through the pipe to identify a possible in-pipe leak.

24. An in-pipe leak detection system, comprising:
a membrane;
a sensing element coupled to the membrane, wherein the sensing element and the membrane are configured to be disposed substantially parallel to or in-line with an axial direction of a fluid flow in a pipe to identify a possible in-pipe leak;
at least one processor coupled to the sensing element, the at least one processor being configured to discriminate between a fluid leak and a false leak detection based on a comparison of a plurality of transient outputs from the sensing element; and
a support structure coupled to at least one of the sensing element and the membrane and configured to position the membrane adjacent to an inner wall of a pipe in which a search for an in-pipe leak is being performed,
wherein the membrane is configured to be drawn into contact with the inner wall in response to a suction force caused by a fluid leak in the pipe, and
wherein the fluid leak is detected based on a transient output from the sensing element that is indicative of a pulling force or strain on the membrane.

25. An in-pipe leak detection system, comprising:
a membrane;
a sensing element coupled to the membrane, wherein the sensing element and the membrane are configured to be disposed substantially parallel to or in-line with an axial direction of a fluid flow in a pipe to identify a possible in-pipe leak;
at least one processor coupled to the sensing element, the at least one processor being configured to receive input from the sensing element to detect a friction force that prevents the membrane and the sensing element from stretching, the at least one processor being configured to use the detected friction force to discriminate between a fluid leak and a false leak detection; and
a support structure coupled to at least one of the sensing element and the membrane and configured to position the membrane adjacent to an inner wall of a pipe in which a search for an in-pipe leak is being performed,
wherein the membrane is configured to be drawn into contact with the inner wall in response to a suction force caused by a fluid leak in the pipe, and
wherein the fluid leak is detected based on a transient output from the sensing element that is indicative of a pulling force or strain on the membrane.

26. An in-pipe leak detection system, comprising:
a membrane;
a sensing element coupled to the membrane, wherein the sensing element and the membrane are configured to be disposed substantially parallel to or in-line with an axial direction of a fluid flow in a pipe to identify a possible in-pipe leak;
at least one position encoder coupled to the support structure;
a support structure coupled to at least one of the sensing element and the membrane and configured to position the membrane adjacent to an inner wall of a pipe in which a search for an in-pipe leak is being performed; and
a processor configured to detect a false fluid leak in response to the at least one position encoder outputting a signal indicating a change in a position of the support structure,
wherein the membrane is configured to be drawn into contact with the inner wall in response to a suction force caused by a fluid leak in the pipe, and
wherein the fluid leak is detected based on a transient output from the sensing element that is indicative of a pulling force or strain on the membrane.

27. An in-pipe leak detection system, comprising:
a membrane;
a sensing element coupled to the membrane, wherein the sensing element and the membrane are configured to be disposed substantially parallel to or in-line with an axial direction of a fluid flow in a pipe to identify a possible in-pipe leak;
at least one inertial measurement unit;
a support structure coupled to at least one of the sensing element and the membrane and configured to position the membrane adjacent to an inner wall of a pipe in which a search for an in-pipe leak is being performed; and
a processor coupled to the at least one inertial measurement unit and configured to detect a false fluid leak in response to the at least one inertial measurement unit outputting a signal indicating a change in a rotational speed of the system,
wherein the membrane is configured to be drawn into contact with the inner wall in response to a suction force caused by a fluid leak in the pipe, and
wherein the fluid leak is detected based on a transient output from the sensing element that is indicative of a pulling force or strain on the membrane.

* * * * *

UNITED STATES PATENT AND TRADEMARK OFFICE
CERTIFICATE OF CORRECTION

PATENT NO. : 10,845,007 B2
APPLICATION NO. : 16/341139
DATED : November 24, 2020
INVENTOR(S) : You Wu et al.

It is certified that error appears in the above-identified patent and that said Letters Patent is hereby corrected as shown below:

In the Claims

At Column 25, Line 43, in Claim 1, change "is being performed;" to "is being performed; and".

At Column 25, Line 65, in Claim 2, change "sensing element and" to "sensing element; and".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*